(12) United States Patent
Aoki et al.

(10) Patent No.: US 10,078,280 B2
(45) Date of Patent: Sep. 18, 2018

(54) METHODS FOR PRODUCING TONER PARTICLE AND PRODUCING RESIN PARTICLE

(71) Applicant: CANON KABUSHIKI KAISHA, Tokyo (JP)

(72) Inventors: Kenji Aoki, Numazu (JP); Yusuke Kosaki, Susono (JP); Noritaka Toyoizumi, Mishima (JP); Tetsuya Kinumatsu, Mishima (JP); Toshifumi Mori, Tokyo (JP); Sakae Suda, Yokohama (JP); Shinnosuke Koji, Yokohama (JP); Shuntaro Watanabe, Hadano (JP); Kazumichi Nakahama, Suntou-gun (JP); Atsushi Tani, Tokyo (JP); Takashige Kasuya, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/623,161

(22) Filed: Jun. 14, 2017

(65) Prior Publication Data

US 2017/0363979 A1 Dec. 21, 2017

(30) Foreign Application Priority Data

Jun. 17, 2016 (JP) ................................. 2016-120400

(51) Int. Cl.
*G03G 9/08* (2006.01)
*G03G 9/087* (2006.01)
*C08F 230/08* (2006.01)

(52) U.S. Cl.
CPC ......... *G03G 9/0815* (2013.01); *C08F 230/08* (2013.01); *G03G 9/0804* (2013.01); *G03G 9/0819* (2013.01); *G03G 9/08711* (2013.01); *G03G 9/08755* (2013.01)

(58) Field of Classification Search
CPC ........................... G03G 9/0804; G03G 9/0815
USPC ....................................... 430/137.1
See application file for complete search history.

(56) References Cited

FOREIGN PATENT DOCUMENTS

| JP | 2007-277511 A | 10/2007 |
|---|---|---|
| JP | 2013-137535 A | 7/2013 |
| JP | 2013-155210 A | 8/2013 |
| JP | 2016-90749 A | 5/2016 |
| JP | 2016-90750 A | 5/2016 |

*Primary Examiner* — Mark A Chapman
(74) *Attorney, Agent, or Firm* — Canon U.S.A. Inc., IP Division

(57) ABSTRACT

A method for producing a toner particle include: (a) mixing a binder resin A, resin fine particles containing a resin B, a resin C, an organic solvent, and carbon dioxide, thereby forming a droplet of a resin solution containing the binder resin A, covered with the resin fine particles; (b) applying a pressure by introducing carbon dioxide, thereby precipitating the resin C at the surface of the droplet; and (c) passing carbon dioxide so as to remove the organic solvent from the droplet with the carbon dioxide. The resin C has an organic polysiloxane structure and a weight average molecular weight of 50,000 to 500,000. The ratio of the weight average molecular weight to the number average molecular weight of the resin C is not more than 5.0. The proportion of the resin C to the rein fine particles is 5.0% by mass to 50.0% by mass.

18 Claims, 1 Drawing Sheet

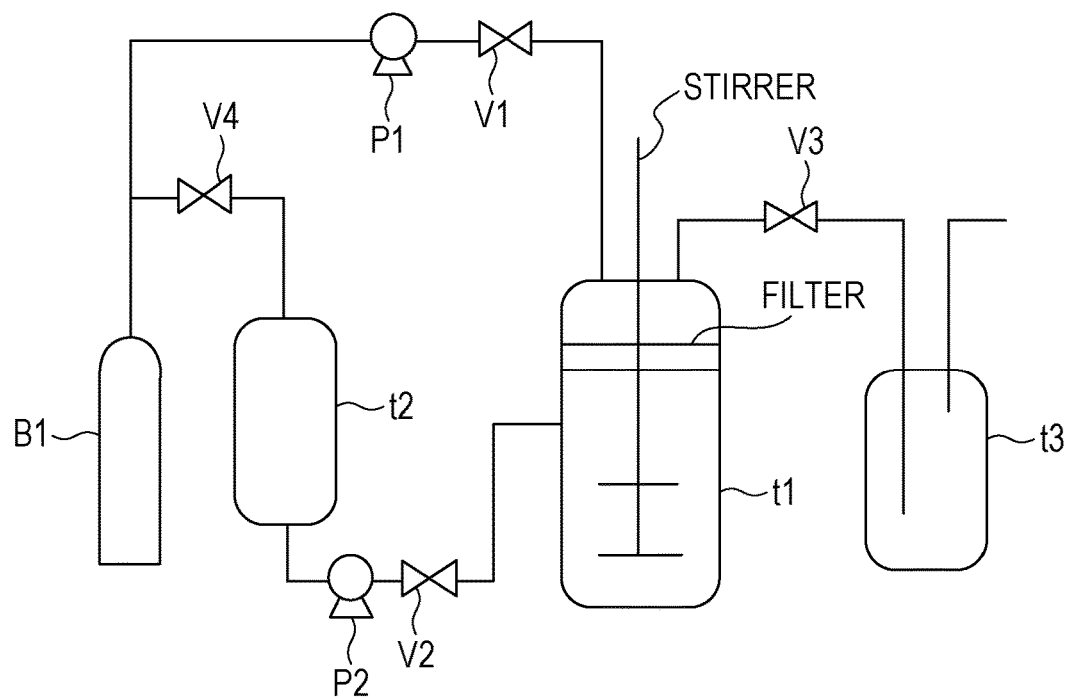

METHODS FOR PRODUCING TONER PARTICLE AND PRODUCING RESIN PARTICLE

BACKGROUND OF THE INVENTION

Field of the Invention

The present disclosure relates to a method for producing a toner particle and a method for producing a resin particle.

Description of the Related Art

Particulate resin, or resin particles, is widely used in paints, inks, toners, and the like. In any field, the control of particle size of resin particles is considered important, and a particulate resin having a sharp particle size distribution is desired.

Particularly in the field of toner, further improvement of image quality is considered important, and, accordingly, it is desirable that the particles of a toner have uniform characteristics thereamong. It is effective in imparting uniform characteristics to reduce and uniformize the particle size of the toner so as to have a sharp particle size distribution. A method called "dissolution suspension method" has been known as a relatively simple technique for producing a toner having a sharp particle size distribution. Also, a toner production method using carbon dioxide as a dispersion medium has recently been disclosed. In this method, first, dispersion of droplets of a resin solution is prepared. In this dispersion, the droplets of a resin solution are dispersed in carbon dioxide. Subsequently, carbon dioxide is further introduced to the dispersion to reduce the organic solvent from the droplets. By this operation, the component of the resin insoluble in carbon dioxide is precipitated to form toner particles.

Such a dissolution suspension method uses a dispersant. The dispersant covers the surfaces of the droplets of the resin solution and thus causes the droplets to disperse stably without aggregating or settling, and thus keeps the droplets dispersed until the organic solvent is removed. The dispersant may be a polymeric dispersant containing a polymer that is soluble in an organic solvent and the dispersion medium. The polymeric dispersant, which has a site having an affinity with the dispersion medium, spreads throughout the dispersion medium and keeps the droplets from colliding with each other. Thus, what is called an excluded volume effect is produced, and the dispersion of the droplets is stabilized by this effect. A resin fine particulate dispersant is called Pickering dispersant, and the use thereof enables the control of the particle size of toners by varying the particle size and the amount of the resin fine particulate dispersant. Thus, the resin fine particulate dispersant is useful in producing a toner having a sharp particle size distribution.

In the dissolution suspension method using carbon dioxide as a dispersion medium, the compositions of the droplets and the dispersion medium vary depending on the amount of introduced carbon dioxide. This is because part of the organic solvent in the droplets dissolves in carbon dioxide, thus migrating to the dispersion medium. Accordingly, it is important to select a dispersant capable of responding to such compositional changes.

Japanese Patent Laid-Open No. 2013-137535 discloses a toner produced by using a resin fine particulate dispersant containing a resin having a comb-like structure including a site having an organic polysiloxane structure and a site having an aliphatic polyester structure, and a binder resin that is a block copolymer containing a crystalline polyester. According to this patent document, this process is useful in keeping droplets stable against the compositional changes because the resin particles have a site having an affinity to carbon dioxide and a site having an affinity to the resin solution in side chains and, therefore, can produce toner particles having a favorable particle size distribution at relatively low temperatures, such as about 25° C.

Japanese Patent Laid-Open No. 2007-277511 discloses a method for producing a toner by using carbon dioxide as a dispersion medium, and using in combination a resin fine particulate dispersant and a polymeric dispersant having an organic polysiloxane structure or a functional group containing fluorine.

Japanese Patent Laid-Open No. 2013-155210 discloses a method for producing a resin particle, in which a droplet of a resin solution is formed by using carbon dioxide as a dispersion medium and, then, another resin solution is added so that the resin of this solution is solidified by carbon dioxide.

To improve the particle size distribution of the resin particle of Japanese Patent Laid-Open No. 2013-137535, droplets of the resin solution were formed under the condition where the viscosity of the resin solution was reduced by heating the resin solution. However, the droplets aggregated and did not form toner particles having a favorable particle size distribution. The reason for this was examined, and it was found that the used resin particles did not have a sufficient resistance to high temperature organic solvents.

Also, the present inventors attempted to produce the toner disclosed in Japanese Patent Laid-Open No. 2007-277511 according to the disclosed method thereof. However, the resulting particles of the toner are not always small and do not have a favorable particle size distribution. The present inventors assume that this is because the used resin fine particulate dispersant and polymeric dispersant did not sufficiently respond to the compositional changes of the droplets and the dispersion medium. In addition, the polymeric dispersant is highly soluble in the dispersion medium and is accordingly in a dissolved state even in the step of removing the solvent. This can cause droplets to aggregate before the organic solvent is removed.

Also, the present inventors attempted to produce the resin particle disclosed in Japanese Patent Laid-Open No. 2013-155210 according to the disclosed method thereof. However, the resulting resin particles were not always small and did not have a favorable particle distribution. In this method, a resin fine particulate dispersant is not used, and the resin to be solidified by carbon dioxide does not have an organic polysiloxane structure or fluorine; hence, the resin is unlikely to be present at the surfaces of the droplets of the resin solution. This is probably the reason why the resulting toner particles are not small and do not have a favorable particle size distribution.

Known methods for producing a toner by using carbon dioxide as a dispersion medium and a resin fine particulate dispersant or a polymeric dispersant have some issues in view of stably forming small toner particles having a sharp particle size distribution.

SUMMARY OF THE INVENTION

The present disclosure provides a method for stably producing small toner particles and resin particles that have a sharp particle size distribution.

According to an aspect of the disclosure, a method for producing a toner particle is provided. The method includes the steps of: (a) mixing a binder resin A, resin fine particles containing a resin B, a resin C, an organic solvent, and carbon dioxide, thereby forming a droplet of a resin solution containing the binder resin A, the droplet being covered with the resin fine particles; (b) applying a pressure by introducing carbon dioxide, thereby precipitating the resin C at the surface of the droplet; and (c) passing carbon dioxide so as to remove the organic solvent from the droplet with the carbon dioxide. The resin C has an organic polysiloxane structure represented by the following formula (i) and a weight average molecular weight Mw of at least 50,000 and not more than 500,000. The ratio Mw/Mn of the weight average molecular weight Mw to the number average molecular weight Mn of the resin C is not more than 5.0. The proportion of the mass of the resin C to the mass of the resin fine particles is at least 5.0% by mass and not more than 50.0% by mass.

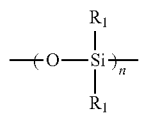

(i)

In formula (i), $R^1$ represents an alkyl group having a carbon number of 1 to 3, and n represents the degree of polymerization.

According to another aspect of the disclosure, a method for producing a resin particle is provided. The method includes the steps of: (a) mixing a resin A, resin fine particles containing a resin B, a resin C, an organic solvent, and carbon dioxide, thereby forming a droplet of a resin solution containing the resin A, the droplet being covered with the resin fine particles; (b) applying a pressure by introducing carbon dioxide, thereby precipitating the resin C at the surface of the droplet; and (c) passing carbon dioxide so as to remove the organic solvent from the droplet with the carbon dioxide. The resin C has an organic polysiloxane structure represented by the above formula (i) and a weight average molecular weight Mw of at least 50,000 and not more than 500,000. The ratio Mw/Mn of the weight average molecular weight Mw to the number average molecular weight Mn of the resin C is not more than 5.0. The proportion of the mass of the resin C to the mass of the resin fine particles is at least 5.0% by mass and not more than 50.0% by mass.

Further features of the present disclosure will become apparent from the following description of exemplary embodiments with reference to the attached drawing.

BRIEF DESCRIPTION OF THE DRAWING

FIGURE is a schematic diagram of a system used for producing toner particles or resin particles according to the present disclosure.

DESCRIPTION OF THE EMBODIMENTS

In the present disclosure, toner particles are produced by a dissolution suspension method using carbon dioxide as a dispersion medium. The method includes the steps of:

(a) mixing a binder resin A, resin fine particles containing a resin B, a resin C, an organic solvent, and carbon dioxide, thereby forming a droplet of a resin solution containing the binder resin A, the droplet being covered with the resin fine particles;

(b) applying a pressure by introducing carbon dioxide, thereby precipitating the resin C at the surface of the droplet; and (c) passing carbon dioxide so as to remove the organic solvent from the droplet with the carbon dioxide.

The resin C has an organic polysiloxane structure, and a weight average molecular weight Mw of at least 50,000 and not more than 500,000. The ratio Mw/Mn of the weight average molecular weight Mw to the number average molecular weight Mn of the resin C is not more than 5.0. The proportion of the mass of the resin C to the mass of the resin fine particles is at least 5.0% by mass and not more than 50.0% by mass.

In the step of (a), a droplet of a resin solution is formed by mixing a binder resin A, resin fine particles containing a resin B, a resin C, an organic solvent, optional additives, such as a coloring agent and a wax, and carbon dioxide. The droplet is covered with the resin fine particles. Droplets thus formed in this step are in a dispersion, and the dispersion medium of this dispersion is mainly carbon dioxide and contains the organic solvent extracted from the droplets of the resin solution. The fine particulate resin (resin fine particles) functions as a dispersant to give a sharp particle size distribution to the droplets. The resin C acts as a polymeric dispersant and functions to help form droplets and to keep the droplets stable. Therefore, the resin C in the step of (a) is dissolved in the organic solvent.

Advantageously, the step of (a) includes the following sub steps (a1) and (a2):

(a1) mixing a resin solution of the binder resin A in the organic solvent, the resin fine particles, and carbon dioxide, thereby forming the droplet of the resin solution, the droplet being covered with the resin fine particles; and (a2) adding the resin C, thereby forming a suspension droplet including the droplet of the resin solution and the resin C at the surface of the droplet.

The process performed through these steps maximizes the effect of a resin fine particulate dispersant to give a satisfactorily sharp particle size distribution to the droplets and the effect of a polymeric dispersant to keep the suspension droplets stable. Thus, the particle size of the toner can be further reduced with a still sharper distribution.

The organic solvent is a substance capable of dissolving the resin C and the binder resin A and is not otherwise limited. Examples of the organic solvent include acetone, methyl ethyl ketone, ethyl acetate, toluene, and tetrahydrofuran.

The step of (b) is intended to precipitate the resin C at the surface of the droplet by introducing carbon dioxide to apply a pressure. By continuing introducing carbon dioxide, the carbon dioxide content in the dispersion medium is increased, and the organic solvent in the droplet is extracted from the droplets to the dispersion medium. Consequently, the resin content in the droplet is increased, and the solubility of the resin C in the droplet is reduced. The precipitation of the resin C in the step of (b) is based on such compositional changes of the droplet and the dispersion medium. In order to efficiently precipitate the resin C, therefore, it is advantageous to reduce the solubility of the resin C.

In the step of (c), toner particles are produced by passing carbon dioxide so as to remove the organic solvent from the droplet with the carbon dioxide. More specifically, carbon dioxide is further mixed with the dispersion medium in which the resin solution is dispersed, thereby extracting the remaining organic solvent from the droplet to the dispersion medium, and the resulting dispersion medium containing the organic solvent is substituted by further carbon dioxide.

In the dissolution suspension method using carbon dioxide, the compositions of the dispersion medium and the droplet of the resin solution are considerably changed from the step of (b) to the Step of (c). In general, although a polymeric dispersant increases solubility in a dispersion medium and produces an excluded volume effect, thus stabilizing dispersion of droplets, it is difficult to respond to the compositional changes of the resin solution and the droplets.

Assume that a polymeric dispersant is designed so as to adsorb to the surfaces of the droplets in the step of (a). In the step of (b), however, the polymeric dispersant is, sometimes, buried in the droplets of the resin solution or released to the dispersion medium from the droplets due to the compositional changes. In these cases, the stability of the dispersion of the droplets is reduced, and the droplets aggregate with one another. This is probably the reason why the particle size distribution of the resulting toner particles (resin particles) becomes broad.

The compositional changes of the droplets and the dispersion medium need not be considered in the case of the known dissolution suspension method using an aqueous dispersion medium performed under atmospheric pressure throughout the process of the method. This is a major difference.

The present inventors focused on this point and found that the aggregation of droplets can be suppressed by forming the droplets of the resin solution and subsequently precipitating the resin C at the surfaces of the droplets.

The resin C will now be described in detail. As described above, the resin C functions as a polymeric dispersant to stabilize the droplets of the resin solution, at the surfaces of the droplets of the resin solution containing the binder resin A that are formed in the step of (a) and covered with the resin fine particles. In the step of (a), the resin C is therefore required to be in a dissolved state and to have a moderate affinity to the dispersion medium. The resin C is then precipitated at the surfaces of the droplets of the resin solution by introducing carbon dioxide in the step of (b). The resin C in this state functions to hinder the droplets from aggregating until the organic solvent is removed from the droplets in the step of (c). It is therefore necessary to reduce the solubility of the resin C in carbon dioxide.

When the resin C has a structure that can be kept dissolved in the step of (a) and precipitated in the step of (b), the resulting toner particles or resin particles can be small and circular and can have a sharp particle size distribution, and such particles can be stably produced. The resin C has an organic polysiloxane structure represented by the following formula (i):

In the formula, $R^1$ represents an alkyl group having a carbon number of 1 to 3 and is advantageously a methyl group. n represents the degree of polymerization and may be at least 2, desirably at least 10, such as at least 50. The upper limit thereof is desirably 200.

The organic polysiloxane structure has a low interfacial tension and a low polarity, and is a very soft structure because the Si—O bond is longer than the C—C bond. Accordingly, the resin C has an affinity to low-polarity carbon dioxide and easily spreads throughout the dispersion medium. Accordingly, the resin C can be present at the surfaces of the droplets of the resin solution.

The resin C has a weight average molecular weight Mw of at least 50,000 and not more than 500,000. When the Mw is in this range, the resin C can spread throughout the dispersion medium in the step of (a) and produce a sufficient excluded volume effect, thus keeping the droplets stable. Consequently, the formation of aggregates can be suppressed. If the Mw is lower than 50,000, a sufficient excluded volume effect cannot be produced, and the droplets of the resin solution are not kept stable. If the Mw is higher than 500,000, the viscosity of the droplets of the resin solution is increased in the step of (a). This makes it difficult to shear the droplets of the resin solution when being formed, leading to an increased droplet size. Consequently, the resulting toner has a large particle size. Advantageously, the weight average molecular weight Mw of the resin C is at least 80,000 and not more than 300,000.

In addition, the ratio Mw/Mn of the weight average molecular weight Mw to the number average molecular weight Mn of the resin C is not more than 5.0.

The Mw/Mn ratio in this range suggests that the resin C has a small variation in molecular weight. Such a resin C can satisfactorily cover the surfaces of the droplets of the resin solution to keep the droplets stable. If the Mw/Mn ratio exceeds 5.0, the variation in molecular weight of the resin C increases, and the coverage of the resin C over the surfaces of the droplets becomes uneven. Consequently, the resulting toner exhibits a broad particle size distribution. Desirably, the Mw/Mn ratio is at least 1.0 and not more than 4.0, such as at least 2.0 and not more than 4.0.

The proportion of the mass of the resin C to the mass of the fine particulate resin is at least 5.0% by mass and not more than 50.0% by mass. When the resin C is used in this range, the resin fine particles contribute to maintaining the particle size distribution of the droplets of the resin solution and keeping the droplets stable. If the mass of the resin C is less than 5.0% relative to the mass of the resin fine particles, the resin C is not likely to function effectively to stabilize the dispersion of the droplets. If the mass of the resin C exceeds 50.0% relative to the mass of the resin fine particles, the resin C hinders the function of the resin fine particles and thus disrupts the particle size distribution of the droplets of the resin solution. Consequently, the particle size distribution of the toner particles is degraded. Advantageously, the proportion of the resin C to the resin fine particles is at least 10.0% by mass and not more than 35.0% by mass.

The toner particles may contain the resin C with a proportion of at least 1.0% by mass and not more than 5.0% by mass relative to the binder resin A. The resin C with a proportion in this range is likely to improve the stability of the droplets of the resin solution and to hinder the formation of aggregates.

The resin C may be a crystalline resin. A crystalline resin refers to a resin in which polymeric molecular chains thereof are regularly arranged. Crystalline resins are difficult to dissolve in carbon dioxide due to such a structure. Therefore, when carbon dioxide concentration is increased in the step of (b), the resin C becomes likely to precipitate, whereas in the step of (a), it is dissolved in the organic solvent and acts as a polymeric dispersant. Thus, the resin C is likely to hinder the formation of aggregates.

Exemplary crystalline resins include resins having a crystalline polyester structure, resins having a crystalline polyvinyl structure, and resins having a crystalline polyurethane structure. Advantageously, the resin C has a crystalline polyester structure.

It is therefore advantageous that the resin C be a polymer obtained by polymerizing a monomer composition containing a monomer S having the organic polysiloxane structure represented by the formula (i) and a monomer T having the crystalline polyester structure.

The monomer composition contains the monomer A with a content of at least 20.0% by mass and not more than 50.0% by mass relative to the total mass of the monomer composition. The monomer composition also contains the monomer T with a content of at least 20.0% by mass and not more than 60.0% by mass relative to the total mass of the monomer composition. Such a polymer can be in a dissolved state and is likely to have an affinity to the dispersion medium in the step of (a), and is likely to be precipitated in the step of (b).

When the monomer S content in the monomer composition is at least 20.0% by mass, the resin C is likely to have an affinity to the dispersion medium and hinders the droplets of the resin solution from aggregating in the step of (a). Thus, the resin C is likely to hinder the formation of aggregates. When the monomer S content is not more than 50.0% by mass, the affinity of the resin C to the dispersion medium is not excessive and is such that the resin C is likely to be precipitated in the step of (b). More advantageously, the monomer S content is at least 22.0% by mass and not more than 48.0% by mass.

When the monomer T content in the monomer composition is at least 20.0% by mass, a sufficient amount of the resin C can be precipitated in the step of (b), thus hindering the formation of aggregates. When the monomer T content is not more than 60.0% by mass, the solubility of the resin C in the organic solvent is not reduced, and the resin C is likely to keep the droplets of the resin solution stable. Consequently, aggregates are not easily formed. More advantageously, the monomer T content is at least 23.0% by mass and not more than 58.0% by mass.

The monomer S may have a number average molecular weight Mn of at least 3,000 and not more than 30,000. When the monomer S has an Mn in this range, the resin C is likely to have an affinity to the dispersion medium. Advantageously, the Mn of the monomer S is at least 3,000 and not more than 20,000, such as at least 3,000 and not more than 15,000.

The monomer T may have a number average molecular weight Mn of at least 2,000 and not more than 15,000. When the monomer T has an Mn in this range, the resin C is likely to be precipitated in the step of (b). Advantageously, the Mn of the monomer T is at least 2,000 and not more than 10,000.

For producing the resin C by using the monomer S and the monomer T, polycondensation or radical polymerization may be applied. In the present disclosure, it is advantageous that the resin C be produced by a radical polymerization using a monomer S having an organic polysiloxane structure site to which a polymerizable unsaturated group is introduced, and a monomer T having a crystalline polyester structure site to which a polymerizable unsaturated group is introduced.

The monomer S having an organic polysiloxane structure site to which a polymerizable unsaturated group is introduced may be produced by a dehydrochlorination reaction of a carbinol-modified polysiloxane with acryloyl chloride or methacryloyl chloride.

The monomer T having a crystalline polyester structure side to which a polymerizable unsaturated group is introduced may be produced by any one of the following processes:
(1) Process of introducing a polymerizable unsaturated group when a polycondensation is performed by using a dicarboxylic acid and a diol as the raw materials of the crystalline polyester The polymerizable unsaturated group may be introduced by any one of the following methods:
(1-1) Using a dicarboxylic acid having a polymerizable unsaturated group in a portion thereof
(1-2) Using a diol having a polymerizable unsaturated group in a portion thereof
(1-3) Using a dicarboxylic acid having a polymerizable unsaturated group in a portion thereof and a diol having a polymerizable unsaturated group in a portion thereof The degree of unsaturation of the monomer T can be controlled by varying the amount of the dicarboxylic acid or diol having a polymerizable unsaturated group.

Examples of the dicarboxylic acid having a polymerizable unsaturated group include fumaric acid, maleic acid, 3-hexenedioic acid, and 3-octenedioic acid. Lower alkyl esters or acid anhydrides of these dicarboxylic acids may be used. In view of cost, fumaric acid or maleic acid is advantageous. Examples of the diol having a polymerizable unsaturated group include 2-butene-1,4-diol, 3-hexene-1,6-diol, and 4-octene-1,8-diol.

The dicarboxylic acid or diol having no polymerizable unsaturated group, used as a raw material of the crystalline polyester may be an aliphatic dicarboxylic acid having a carbon number of 2 to 20, or an aliphatic diol having a carbon number of 2 to 20. Advantageously, the aliphatic dicarboxylic acid and the aliphatic diol are linear.

Examples of the linear aliphatic dicarboxylic acid that can be used herein include, but are not limited to, oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid. These compounds may be used in combination, and lower alkyl esters or acid anhydrides of these dicarboxylic acids may be used.

Examples of the linear aliphatic diol that can be used herein include, but are not limited to, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. These compounds may be used in combination if necessary.

The process for producing the monomer T by a polycondensation of an aliphatic dicarboxylic acid monomer and an aliphatic diol monomer is not particularly limited, and a conventional polyester polymerization may be used. For example, a direct polycondensation or a transesterification method may be used depending on the types of the monomers.

Advantageously, the monomer T is produced at a temperature of at least 180° C. and not more than 230° C., and, if necessary, the reaction can be performed while the water and the alcohol produced by condensation are removed by reducing the pressure in the reaction system.

A catalyst may be used for the production of the monomer T, and examples thereof include titanium catalysts, such as titanium tetraethoxide, titanium tetrapropoxide, titanium tetraisopropoxide, and titanium tetrabutoxide, and tin catalysts, such as dibutyltin dichloride, dibutyltin oxide, and diphenyltin oxide.

(2) Process of coupling a vinyl compound and a crystalline polyester prepared by polycondensation of a dicarboxylic acid and a diol In this coupling, a vinyl compound having a functional group capable of reacting with a terminal functional group of the polyester may be directly coupled with the polyester. Alternatively, the terminal of the polyester may be modified with a binder so as to be able to react with the functional group of the vinyl compound, and then subjected to coupling with the vinyl compound. For example, the coupling may be performed by any one of the following methods:

(2-1) Coupling a carboxy-terminated polyester with a vinyl compound having a hydroxy group by a condensation reaction, wherein the proportion of the dicarboxylic acid to the diol (dicarboxylic acid/diol) used for preparing the polyester is desirably at least 1.02 and not more than 1.20

(2-2) Coupling a hydroxy-terminated polyester with a vinyl compound having an isocyanate group by a urethanation reaction (2-3) Coupling a hydroxy-terminated polyester with a vinyl compound having an isocyanate group by a urethanation reaction using diisocyanate as a binder In the coupling operations of (2-2) and (2-3), the proportion of the dicarboxylic acid to the diol (dicarboxylic acid/diol) used for preparing the polyester is desirably at least 1.02 and not more than 1.20.

The dicarboxylic acid and the diol may be the same as used in the process of (1).

Examples of the vinyl compound having a hydroxy group include hydroxystyrene, N-methylolacrylamide, N-methylolmethacrylamide, hydroxyethyl acrylate, hydroxyethyl methacrylate, hydroxypropyl acrylate, hydroxypropyl methacrylate, polyethylene glycol monoacrylate, polyethylene glycol monomethacrylate, allyl alcohol, methallyl alcohol, crotyl alcohol, isocrotyl alcohol, 1-butene-3-ol, 2-butene-1-ol, 2-butene-1,4-diol, propargyl alcohol, 2-hydroxyethyl propenyl ether, and sucrose allyl ether. Among these, hydroxyethyl acrylate and hydroxyethyl methacrylate are advantageous.

Examples of the vinyl compound having an isocyanate group include 2-isocyanatoethyl acrylate, 2-isocyanatoethyl methacrylate, 2-(O-[1'-methylpropylideneamino]carboxyamino)ethyl methacrylate, 2-[(3,5-dimethylpyrazolyl)carbonylamino]ethyl methacrylate, and m-isopropenyl-α,α-dimethylbenzyl isocyanate. Among these, 2-isocyanatoethyl acrylate and 2-isocyanatoethyl methacrylate are advantageous.

Examples of the diisocyanate include aromatic diisocyanates having a carbon number (except for the carbon of the NCO group, the same applies hereinafter) of 6 to 20, aliphatic diisocyanates having a carbon number of 2 to 18, alicyclic diisocyanates having a carbon number of 4 to 15, and compounds (having a urethane group, a carbodiimide group, an allophanate group, a urea group, a biuret group, uretdione group, uretonimine group, isocyanurate group, or an oxazolidone group) modified from these diisocyanates (hereinafter referred to as modified diisocyanate).

Exemplary aromatic diisocyanates include m- and p-xylylene diisocyanate (XDI), and α,α,α',α'-tetramethylxylylene diisocyanate.

Exemplary aliphatic diisocyanates include ethylene diisocyanate, tetramethylene diisocyanate, hexamethylene diisocyanate (HDI), and dodecamethylene diisocyanate.

Exemplary alicyclic diisocyanates include isophorone diisocyanate (IPDI), dicyclohexylmethane 4,4'-diisocyanate, cyclohexylene diisocyanate, and methylcyclohexylene diisocyanate.

Among these, XDI, HDI, and IPDI are advantageous.

(3) Process of coupling a vinyl compound and a hydroxy-terminated polyester prepared by ring-opening polymerization of an aliphatic lactone This process may be performed by either of the following methods:

(3-1) Coupling a polyester prepared by ring-opening polymerization of an aliphatic lactone with a vinyl compound having a carboxy group by a condensation reaction (3-2) Coupling a polyester prepared by ring-opening polymerization of an aliphatic lactone with an acid halide by a dehydrochlorination reaction Examples of the aliphatic lactone include, but are not limited to, δ-hexalanolactone, δ-octanolactone, ε-caprolactone, δ-dodecanolactone, α-methyl-γ-butyrolactone, β-methyl-δ-valerolactone, glycolide, and lactide. Among these, ε-caprolactone is advantageous in terms of reactivity and availability.

Examples of the vinyl compound having a carboxy group used in the method of (3-1) include acrylic acid, methacrylic acid, crotonic acid, isocrotonic acid, 2-methacryloyloxyethyl succinic acid, 2-methacryloyloxyethyl hexahydrophthalic acid, and 2-methacryloyloxyethyl glutarate; dicarboxylic acids and anhydrides thereof, such as maleic acid (anhydride), fumaric acid, and itaconic acid (anhydride); dicarboxylic acid monoalkyl esters, such as monomethyl maleate, monoethyl maleate, monobutyl maleate, monooctyl maleate, monomethyl fumarate, and monoethyl fumarate. Among these, acrylic acid and methacrylic acid are advantageous. These vinyl compounds having one or more carboxy groups may be used singly or in combination.

Examples of the acid halide used in the method of (3-2) include carboxylic acid chlorides, such as acryloyl chloride and methacryloyl chloride.

For producing the resin C, any other vinyl monomer generally used in polymerization of conventional resins may be added in addition to the monomer S and the monomer T.

Examples of such a vinyl monomer include:
aliphatic vinyl hydrocarbons including alkenes, such as ethylene, propylene, butane, isobutylene, pentene, heptane, diisobutylene, octane, dodecane, octadecene, and other α-olefins, and alkadienes, such as butadiene, isoprene, 1,4-pentadiene, 1,6-hexadiene, and 1,7-octadiene;
alicyclic vinyl hydrocarbons including mono- or di-cycloalkenes and alkadienes, such as cyclohexene, cyclopentadiene, vinylcyclohexene, and ethylidenebicycloheptene, and terpened, such as pinene, limonene, and indene;
aromatic vinyl hydrocarbons including styrenes and hydrocarbyl (alkyl, cycloalkyl, aralkyl, and/or alkenyl) substitution products thereof, such as α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, and trivinylbenzene, and vinyl naphthalene;
carboxy group-containing vinyl monomers and metal salts thereof including unsaturated monocarboxylic and dicarboxylic acids having a carbon number of 3 to 30, such as acrylic acid, methacrylic acid, maleic acid, maleic anhydride, maleic acid monoalkyl esters, fumaric acid, fumaric acid monoalkyl esters, crotonic acid, itaconic acid, itaconic acid monoalkyl esters, itaconic acid glycol monoether, citraconic acid, citraconic acid monoalkyl esters, and cinnamic acid, and anhydrides and monoalkyl (carbon number of 1 to 27)

esters of these carboxylic acids; vinyl esters, such as vinyl acetate, vinyl butyrate, vinyl propionate, diallyl phthalate, diallyl adipate, isopropenyl acetate, vinyl methacrylate, methyl 4-vinylbenzoate, cyclohexyl methacrylate, benzyl methacrylate, phenyl acrylate, phenyl methacrylate, vinyl methoxyacetate, vinyl benzoate, ethyl α-ethoxyacrylate, alkyl acrylates, and alkyl methacrylates (methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate), dialkyl fumarates (fumaric acid dialkyl esters, wherein 2 alkyl groups are linear, branched, or alicyclic groups having a carbon number of 2 to 8), and dialkyl maleates (maleic acid dialkyl esters, wherein 2 alkyl groups are linear, branched, or alicyclic groups having a carbon number of 2 to 8);

polyallyloxyalkanes, such as diallyloxyethane, triallyloxyethane, tetraallyloxyethane, tetraallyloxypropane, tetraallyloxybutane, and tetrametaallyloxyethane; vinyl monomers having a polyalkylene glycol chain, such as polyethylene glycol (molecular weight: 300) monoacrylate, polyethylene glycol (molecular weight: 300) monomethacrylate, polypropylene glycol (molecular weight: 500) monoacrylate, and polypropylene glycol (molecular weight: 500) monomethacrylate; methyl alcohol ethylene oxide (hereinafter abbreviated as EO) (10 mol) adduct acrylate, methyl alcohol EO (10 mol) adduct methacrylate, lauryl alcohol EO (30 mol) adduct acrylate, lauryl alcohol EO (30 mol) adduct methacrylate); and polyacrylates and polymethacrylates (polyacrylates and polymethacrylates of polyhydric alcohols).

Styrene and methacrylic acid are advantageous as further vinyl monomers for the polymerization.

When the resin C is produced by radical polymerization, a conventional radial polymerization can be applied. For example, monomer S, monomer T, a further vinyl monomer, and a polymerization initiator are dissolved in an organic solvent. After degassing, the solution is subjected to polymerization.

Examples of the polymerization initiator used for the radical polymerization include azo- or diazo-based polymerization initiators, such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile; and peroxide-based polymerization initiators, such as benzoyl peroxide, methyl ethyl ketone peroxide, diisopropyl peroxycarbonate, cumene hydroperoxide, 2,4-dichlorobenzoyl peroxide, lauroyl peroxide, and tert-butyl peroxypivalate.

The amount of the polymerization initiator to be used depends on the degree of polymerization and is, in general, at least 0.1 parts by mass and not more than 20.0 parts by mass relative to 100 parts by mass of the monomers. Although the polymerization initiator suitably used depends slightly on the polymerization method, one or more initiators are selected in reference to the 10-hour half-life temperature.

The resin C may be produced by living radical polymerization, such as atom transfer radical polymerization (ATRP), reversible addition fragmentation chain transfer (RAFT), or nitroxide mediated radical polymerization (NMP).

The resin fine particles containing resin B will now be described.

The resin fine particles function to cover the droplets of the resins solution, thus give a sharp particle size distribution to the droplets. From the viewpoint of covering the droplets of the resin solution, the resin fine particles are required to have an affinity to both the droplets of the resin solution and dispersion medium and to be not soluble much in the organic solvent.

As described above, in the dissolution suspension method using carbon dioxide, the compositions of the dispersion medium and the droplets of the resin solution are considerably changed from the step of (b) to the Step of (c). The resin fine particles are required to remain at the interfaces between the droplets and the dispersion medium even though such compositional changes occur.

Accordingly, it is advantageous that the resin B be a polymer obtained by polymerizing a monomer composition containing a monomer X having an organic polysiloxane structure and also having a polymerizable unsaturated group at one end of the molecule thereof, a monomer Y having a polymerizable unsaturated group at one end of the molecule thereof, and a monomer Z having at least two polymerizable unsaturated groups in the molecule thereof.

In this polymerization, the monomer X functions to form a site having an affinity to the dispersion medium as a side chain of the resin B. The monomer Y functions to form a site having an affinity to the droplets of the resin solution as a side chain of the resin B. The monomer Z functions to form a crosslinking structure so that the resin B does not dissolve in the solvent.

When the resin fine particles containing the resin B is used, the side chains of the resin B reach the dispersion medium and the droplets of the resin solution and keep stably at the interfaces of the droplets with the dispersion medium while changing in state according to the compositional changes.

The present inventors further found that the functions of the monomers can be enhanced effectively by appropriately controlling the solubility parameters (SP values) of the monomers X, Y, and Z.

SP values are based on Hansen solubility parameters. In Hansen's approach, the evaporation energy of a molecule is divided into three parts: a dispersion parameter D, a polarity parameter P, and a hydrogen bonding parameter H, and thus represented as a three-dimensional vector. More specifically, the SP value used herein is the square root of the sum of the squares of the dispersion parameter D, the polarity parameter P, and the hydrogen bonding parameter H, and is hence a scalar quantity of the three-dimensional vector. The closer the SP values of two different materials, the higher the chemical affinity.

In view of intermolecular interactions, the dispersion parameter D is affected by van der Waals interactions, the polarity parameter P is affected by intermolecular electrostatic interactions and intramolecular dipole moment, and the hydrogen bonding parameter H is affected by hydrogen bonding action.

The SP value of a material used herein can be determined by calculation using the values of dispersion parameter D, polarity parameter P, and hydrogen bonding parameter H and the values of molar volume of each constituent of the material, stored in the database of a commercially available software program HSPiP 4th Edition 4. 1. 03, and the mole ratio of the constituents.

Advantageously, the SP value $SP_X$ $((J/cm^3)^{1/2})$ of the monomer X, the SP value $SP_Y((J/cm^3)^{1/2})$ of the monomer Y, the polarity parameter $P_Y$ $((J/cm^3)^{1/2})$ of the SP value of the monomer Y, the polarity parameter $P_Z$ $((J/cm^3)^{1/2})$ of the SP value of the monomer Z, and the SP value $SP_A$ $((J/cm^3)^{1/2})$ of the binder resin A satisfy the following relationships (1) to (3):

$$SP_Y - SP_X \geq 2.0 \qquad (1)$$

$$(SP_X + SP_Y)/2 < SP_A \qquad (2)$$

$$P_Z - P_Y \geq 1.0 \qquad (3)$$

Relationship (1) represents the relationship between the SP values of the monomers X and Y. When $SP_X$ and $SP_Y$ satisfy relationship (1), the side chain derived from the monomer X of the resin B is oriented to the dispersion medium effectively. More specifically, when the $(SP_Y - SP_X)$ value is 2.0 or more, the difference between the SP values of the monomers X and Y increases, and the function of the site having an affinity to the dispersion medium and the function of the site having an affinity to the droplets of the resin solution become different clearly. Consequently, the resin fine particles become likely to keep present at the interfaces of the droplets with the dispersion medium, thus helping form circular toner particles having a sharp particle size distribution without increasing the particle size. Advantageously, the $(SP_Y - SP_X)$ value is at least 6.0 and not more than 15.0.

Relationship (2) represents the relationship of the midpoint between the SP values of the monomers X and Y with the SP value of the binder resin A. When the value of the midpoint is lower than $SP_A$, $SP_Y$ is closer to $SP_A$ than $SP_X$. More specifically, when relationship (2) holds true, the monomer Y has a higher affinity to the binder resin A than the monomer X, and the droplets of the resin solution is more likely to be kept dispersed in the dispersion medium. Consequently, the resulting toner particles are likely to have a sharp particle size distribution without increasing the particle size.

Focusing on the relationship between the SP values of the monomers X and Z, the inventors found that the polarity parameter P of the SP value components (dispersion parameter D, polarity parameter P, and hydrogen bonding parameter H) particularly influences the stability of the droplets. It is thought that the polarity of a monomer is affected by the bipolar moment in the molecule; hence, the larger the polarity parameter P, the higher the polarity of the monomer.

Relationship (3) represents the relationship between the polarity parameter of the monomers Y and Z. In order for the droplets of the resin solution to disperse stably in the dispersion medium with the resin fine particles kept present at the interfaces of the droplets, the resin B has to be in a state where the sites thereof each having an affinity to the dispersion medium or the droplets are likely to be exposed at the surfaces of the resin fine particles. When relationship (3) holds true, the polarity of the monomer Z is much higher than that of the monomer Y. It is known that carbon dioxide has a polarity parameter P close to 0. Hence, the polarity of the monomer Y is closer to that of the dispersion medium than that of the monomer Z. This suggests that the resin B can be kept in the state where the site thereof derived from the monomer Y is likely to be exposed at the surfaces of the resin fine particles. Thus, the molecular mobility of the site derived from the monomer Y is increased, so that the resin fine particles become likely to be present at the interfaces of the droplets of the resin solution with the dispersion medium. When relationship (3) holds true, the molecular mobility of the site derived from the monomer Y is maintained, and accordingly, the resin fine particles become unlikely to separate from the interfaces of the droplets. Consequently, the resulting toner particles are likely to have a sharp particle size distribution without increasing the particle size. Advantageously, the $(P_Z - P_Y)$ value is at least 1.0 and not more than 7.0.

The binder resin A, which will be described later, desirably has an $SP_A$ satisfying the following relationship (4):

$$17.0 \leq SP_A \leq 21.0 \qquad (4)$$

When $SP_A$ is in this range, the binder resin A can be dissolved in the organic solvent. This enables the resin solution to form droplets in the step of (a) and the solvent to be efficiently removed in the step of (c). More specifically, when $SP_A$ is 17.0 or more, the binder resin A exhibits a low affinity to the dispersion medium and does not dissolve in the dispersion medium. Consequently, the interfaces of the droplets are kept stable, and the droplets have a sharp particle size distribution. When $SP_A$ is not more than 21.0, the binder resin A exhibits a low affinity to the organic solvent and helps remove the organic solvent efficiently in the step of (c). Consequently, droplets do not aggregate, and accordingly, the increase in particle size is likely to be suppressed.

The monomer X has an organic polysiloxane structure and also has a polymerizable unsaturated group at one end of the molecule. By polymerization using a monomer composition containing a monomer X, the resin B has a structure having an affinity to the dispersion medium as a side chain.

The monomer X may have a structure represented by the following formula (ii):

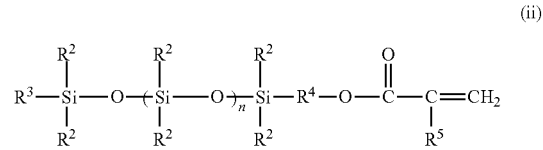

In the formula, $R^2$ and $R^3$ each represent an alkyl group, $R^4$ represents an alkylene group, and $R^5$ represents a hydrogen atom or a methyl group. n represents the degree of polymerization.

Since the Si—O bond is longer than the C—C bond, the organic polysiloxane structure is soft, as described above. If the resin B of the resin fine particles is produced from materials including the monomer X, the side chain having an organic polysiloxane structure present at the surfaces of the resin fine particles is oriented to the dispersion medium. The orientation can be changed according to the compositional change of the dispersion medium in and after the step of (b).

The degree of polymerization of the structure represented by formula (ii) may be at least 2 and not more than 100. When the degree of polymerization is in this range, the side chain having the organic polysiloxane structure can extend favorably when oriented to the dispersion medium. More specifically, when the degree of polymerization is 2 or more, the side chain extends favorably, and the orientation changes satisfactorily according to the compositional change. Thus, the droplets are kept stable and circular. Also, as long as the degree of polymerization is not more than 100, the side chain having the organic polysiloxane structure does not excessively extend. Accordingly, the monomer X is kept reactive with other monomers for producing the resin B, and the low-molecular weight component of the resin B does not increase. Consequently, the resin B is kept resistant to the solvent, and the droplets are kept stable without aggregating.

The proportion of the monomer X to be used may be at least 20.0% by mass and not more than 50.0% by mass relative to the total mass of the monomers used for producing the resin B. When the proportion of the monomer X is in this range, the resin B exhibits a good affinity to the dispersion medium.

The monomer Y has a structure having an affinity to the droplets, and has a polymerizable unsaturated group at one end of the molecule. By polymerization using a monomer composition containing a monomer Y, the resulting resin B has a structure having an affinity to the droplets as a side chain.

If the resin B of the resin fine particles is produced by using the monomer Y, the side chain having an affinity to the droplets present at the surfaces of the resin fine particles is oriented to the droplets. The orientation can be changed according to the compositional change of the droplets in and after the step of (b).

The structure having an affinity to the droplets can be appropriately selected according to what the binder resin A is, and examples thereof include a polyvinyl structure, a polyester structure, a polyurethane structure, and a polyurea structure. From the viewpoint of maintaining elasticity, a polyvinyl structure and a polyester structure are advantageous.

The monomer Y having a polyvinyl structure and also having a polymerizable unsaturated group at one end of the molecule may be produced by a process through the following two steps.

First step: synthesizing a polymer having a reactive functional group at one end thereof by polymerization using a vinyl monomer in the presence of a chain transfer agent having a reactive functional group, such as a hydroxy group or a carboxy group Second step: reacting the reactive functional group of the polymer prepared in the first step with a compound having a meth acryloyl group or acryloyl group and a functional group reactive with that reactive functional group of the polymer Example of the vinyl monomer include, but are not limited to, acrylic esters, methacrylic esters, acrylic acid, methacrylic acid, styrene, α-methyl styrene, acrylonitrile, and vinyl acetate. Acrylic esters and methacrylic esters are superior in copolymerizability, mechanical properties of the cured product, weather resistance, and water resistance.

An example of the acrylic esters and the methacrylic esters may be a compound having one acryloyl or methacryloyl group in the molecule thereof (hereinafter referred to as monofunctional acrylate or methacrylate).

Examples of the monofunctional acrylate or methacrylate include: alkyl acrylates and alkyl methacrylates cited as the vinyl monomer of the resin C; alicyclic acrylates and alicyclic methacrylates, such as cyclohexyl acrylate, tricyclodecane acrylate, dicyclopentenyl acrylate, dicyclopentanyl acrylate, dicyclopentenyloxyethyl acrylate, dicyclopentanyloxyethyl acrylate, tricyclodecanyl acrylate, isobornyl acrylate, and adamantyl acrylate; hydroxy group-containing acrylates and hydroxy group-containing methacrylates, such as 2-hydroxyethyl acrylate, 2-hydroxypropyl acrylate, 4-hydroxybutyl acrylate, and 2-hydroxyethyl acrylate ε-caprolactone adduct; alkoxyalkyl acrylates and alkoxyalkyl methacrylates, such as 2-methoxyethyl acrylate, methoxytriethylene glycol acrylate, 2-ethylhexyl carbitol acrylate, and ethoxyethoxyethyl acrylate; heteroatom-containing acrylates and heteroatom-containing methacrylates, such as dimethylaminoethyl acrylate and trifluoroethyl acrylate; phenoxyethyl acrylate, o-phenylphenoxyethyl acrylate, p-cumylphenoxyethyl acrylate, nonylphenoxyethyl acrylate, benzyl acrylate, acrylates or methacrylates of alkylene oxide-modified phenol derivatives, and aromatic acrylates of 2-hydroxy-3-phenoxypropyl acrylate; tetrahydrofurfuryl acrylate; maleimide acrylate and maleimide methacrylate of N-acryloyloxyethyltetrahydrophthalimide or N-acryloyloxyethylhexahydrophthalimide; glycidyl acrylate, polycaprolactone-modified acrylic acid, and polycaprolactone-modified 2-hydroxyethyl acrylate; alkoxysilyl-containing acrylates and alkoxysilyl-containing methacrylates, such as 3-trimethoxysilylpropyl acrylate, 3-triethoxysilylpropyl acrylate, 3-triisopropoxysilylpropyl acrylate, and 3-methyldimethoxysilylpropyl acrylate; and oxazolidinone ethyl acrylate.

Examples of the chain transfer agent include mercaptoacetic acid, mercaptopropionic acid, 2-propanethiol, 2-mercaptan ethanol, thiophenol, dodecyl mercaptan, and thioglycerol. These agents may be used singly or in combination.

The compound having an acryloyl or a methacryloyl group may have a functional group reactive with the reactive functional group of the chain transfer agent. For example, in the case of using a chain transfer agent having a carboxy group as the reactive functional group, a compound having an epoxy group, such as glycidyl methacrylate or 4-hydroxybutyl acrylate glycidyl ether may be used. In the case of using a chain transfer agent having a hydroxy group as the reactive functional group, a compound having an isocyanate group, such as 2-isocyanatoethyl methacrylate or 2-isocyanatoethyl acrylate, may be used.

For accelerating the reaction, some catalysts may be used in combination, and examples thereof include tertiary amines, quaternary ammonium salts, and metal catalysts.

Among the reactions described above, it is advantageous to react a polymer having a hydroxy group at one end with a compound having an isocyanate group. This reaction can be completed in a short time under the conditions of a low temperature in the presence of a small amount of catalyst while hindering the cured product from being colored with time. From the viewpoint of the curing of an active energy-curable resin composition, a compound having an acryloyl group may be selected from the compounds having an acryloyl group or a methacryloyl group.

The polymerization initiator is a compound that can produce radicals at a predetermined reaction temperature. For example, such a polymerization initiator may be selected from the polymerization initiators cited for the radical polymerization for producing the resin C.

The monomer Y having a polymerizable unsaturated group at one end of the molecule thereof and a polyvinyl structure may be produced by solution polymerization using an organic solvent. Examples of the organic solvent that can be used include, but are not limited to, organic hydrocarbon compounds; cyclic ethers, such as tetrahydrofuran and dioxane; aromatic hydrocarbon compounds, such as benzene, toluene, and xylene; esters, such as ethyl acetate and butyl acetate; and ketones, such as acetone, methyl ethyl ketone, and cyclohexanone.

A dehydrating agent, such as trimethyl orthoacetate or trimethyl orthoformate, may be added to remove water from the organic solvent.

The monomer Y having a polyester structure and also having a polymerizable unsaturated group at one end of the molecule may be produced by the following processes.

(1) Process of coupling a vinyl compound and a polyester prepared by polycondensation of a dicarboxylic acid and a diol This is performed in the same manner as any of the methods of (2-1) to (2-3) described for producing the monomer T used as an ingredient of the resin C. The dicarboxylic acid and diol used in this process may be selected from those used in the methods of (2-1) to (2-3) and other monomers that can be used for producing amorphous polyesters.

Monomers used for producing amorphous polyesters include known divalent carboxylic acids and dihydric alcohols.

Exemplary divalent carboxylic acids include dibasic acids, such as succinic acid, adipic acid, sebacic acid, phthalic acid, isophthalic acid, terephthalic acid, malonic acid, and dodecenylsuccinic acid; anhydrides and lower alkyl esters of these dibasic acids; and aliphatic unsaturated dicarboxylic acids, such as maleic acid, fumaric acid, itaconic acid, and citraconic acid.

A trivalent carboxylic acid may be used, and examples thereof include 1,2,4-benzenetricarboxylic acid, 1,2,5-benzenetricarboxylic acid, and anhydrides and lower alkyl esters of these trivalent carboxylic acids. These carboxylic acids may be used singly or in combination.

Exemplary dihydric alcohols include alkylene glycols, such as ethylene glycol, 1,2-propylene glycol, and 1,3-propylene glycol; alkylene ether glycols, such as polyethylene glycol and polypropylene glycol; alicyclic diols, such as 1,4-cyclohexane dimethanol; bisphenols, such as bisphenol A; and alkylene oxides (ethylene oxide and propylene oxide) adducts of alicyclic diols.

The alkyl portion of the alkylene glycols or the alkylene ether glycols may be linear or branched.

The amorphous polyester resin may be synthesized by, but not limited to, transesterification, direct polymerization, or a combination of these methods.

(2) Process of coupling a vinyl compound and a hydroxy-terminated polyester prepared by ring-opening polymerization of an aliphatic lactone This is performed in the same manner as the methods of (3-1) and (3-2) described for producing the monomer T used as an ingredient of the resin C.

The monomer T may have a number average molecular weight Mn of at least 1,000 and not more than 10,000. The monomer T having an Mn in this range helps the side chain having a structure having an affinity to the droplets to orient to the droplets. More specifically, when the Mn is 1000 or more, the molecular mobility of the side chain is maintained, so that the resin fine particles are easily adsorbed to the interfaces of the droplets, thus hindering the formation of large particles. Also, as long as the Mn is not more than 10,000, the monomer T is kept reactive with other monomers used for producing the resin B, and the low-molecular weight component of the resin B does not increase. Consequently, the resin B is kept resistant to the solvent, and the stability of the droplets is increased.

The proportion of the monomer Y to be used may be at least 20.0% by mass and not more than 50.0% by mass relative to the total mass of the monomers used for producing the resin B. When the proportion of the monomer Y is in this range, the resin B exhibits a good affinity to the droplets.

The sum of the masses of the monomer X and the monomer Y may be at least 45.0% by mass and not more than 90.0% by mass relative to the total mass of the monomers used for producing the resin B. The proportions of the monomers are in such a range, the resulting resin B can act satisfactorily as a fine particulate dispersant. More specifically, when the sum of the monomers X and Y is 45.0% by mass or more, the resin B can exhibit a good affinity to both the dispersion medium and the droplets, thus helping the droplets disperse stably. When it is not more than 90.0% by mass, other monomers required to form the skeleton of the resin B can be added in a proportion, and thus the resulting resin can be stable. Advantageously, the sum of the monomers X and Y is at least 45.0% by mass and not more than 80.0% by mass.

The monomer Z has at least two polymerizable unsaturated groups in the molecule thereof. By polymerization using a monomer composition containing a monomer Z, the resulting resin B can be stable to the organic solvent.

Exemplary monomers that can be used as the monomer Z include polyacrylates and polymethacrylates (polyacrylates and polymethacrylates of polyhydric alcohols, such as ethylene glycol diacrylate, ethylene glycol dimethacrylate, propylene glycol diacrylate, propylene glycol dimethacrylate, neopentyl glycol diacrylate, neopentyl glycol dimethacrylate, trimethylolpropane triacrylate, trimethylolpropane trimethacrylate, polyethylene glycol diacrylate, polyethylene glycol dimethacrylate, diethylene glycol diacrylate, triethylene glycol diacrylate, tetraethylene glycol diacrylate, ployproylene diacrylate, 1,6-hexanediol diacrylate, tripropylene glycol diacrylate, dipropylene glycol diacrylate, polypropylene glycol diacrylate, 2,2'-bis(4-(acryloxy diethoxy)phenyl)propane, trimethylolpropane triacrylate, tetramethylolmethane tetraacrylate, diethylene glycol dimethacrylate, triethylene glycol dimethacrylate, tetraethylene glycol dimethacrylate, 1,3-butylene glycol dimethacrylate, 1,6-hexanediol dimethacrylate, 1,9-nonanediol diacrylate, polypropylene glycol dimethacrylate, 2,2'-bis(4-(methacryloxy diethoxy)phenyl)propane, 2,2'-bis(4-(methacryloxy polyethoxy)phenyl)propane, trimethylolpropane trimethacrylate, and tetramethylolmethane tetramethacrylate), divinylbenzene, trivinylbenzene, octadiene, divinylnaphthalene, divinyl ether, acrylic-modified silicone (modified at both ends), and methacrylic-modified silicone (modified at both ends).

Among these, monomers having an ether bond are advantageous. Monomers having an ether bond have relatively high polarity parameter $P_Z$ of the SP value and are accordingly useful in satisfying relationship (3).

The crosslink density of the resin B can be controlled by varying the molecular weight and the amount of the monomer Z.

The molecular weight of the monomer Z represents the distance between crosslinking points of the resin B, and the number average molecular weight Mn of the monomer Z may be at least 200 and not more than 2,000. The amount of the monomer Z to be used corresponds to the number of crosslinking points of the resin B, and the proportion of the monomer Z may be at least 1.0% by mass and not more than 10.0% by mass relative to the total mass of the monomers used for producing the resin B.

When the molecular weight and the amount of the monomer Z are in these ranges, the resulting resin B can be stable to the organic solvent, and, in addition, the sides chains each having an affinity to the dispersion medium or the droplets and present at the surfaces of the resin fine particles exhibit a good molecular mobility. More specifically, when the Mn of the monomer Z is 200 or more, the distance between crosslinking points is long, and the side chains of the resin B exhibit good molecular mobilities. Thus, the resin B helps the droplets disperse stably. When the Mn is not more than 2000, the resin B has a good resistance to the solvent and thus can help the droplets disperse stably. When the proportion of the monomer Z is 1.0% by mass or more, the resin B has a large number of crosslinking points and accordingly exhibits a good resistance to solvent, thus helping the droplets disperse stably. When the proportion of the monomer Z is not more than 10.0% by mass, the number of crosslinks is not excessive. Accordingly, the side chains exhibit good molecular mobilities, so that the resin fine particles are kept present at the interfaces of the droplets to help the droplets disperse stably. Advantageously, the proportion of the monomer Z is at least 2.0% by mass and not more than 8.0% by mass.

For producing the resin B, a further vinyl monomer may be used in addition to the monomers X, Y, and Z. The further vinyl monomer may be selected from monomers conventionally used for polymerizing resin materials, as in the case of producing the resin C.

The resin B content in the toner particles may be at least 3.0% by mass and not more than 15.0% by mass. When the resin B content is in this range, the droplets have a favorable particle size. Consequently, the resulting toner particles have a favorable particle size. Advantageously, the resin B content is at least 4.0% by mass and not more than 10.0% by mass.

The resin fine particles may have a volume average particle size of at least 30 nm and not more than 200 nm. The resin fine particles having such a particle size can sufficiently cover the surfaces of the droplets and help the resulting toner particles have a desired particle size, thus improving the particle size distribution of the toner particles. Advantageously, the particle size of the resin fine particles is at least 50 nm and not more than 150 nm.

The binder resin A will now be described. The binder resin A is soluble in an organic solvent and is not otherwise limited. Examples thereof include polyvinyl resin, polyester resin, polyurethane resin, and polyurea resin. Polyester resin is more advantageous. The binder resin A may be crystalline or amorphous.

If a polyvinyl resin is used as the binder resin A, the binder resin A may be obtained by polymerizing vinyl monomers that can be used for the resin B or the resin C.

If a polyester resin is used as the binder resin A, the binder resin A may be a crystalline polyester of the monomer T or Y, or an amorphous polyester.

The case of using a polyurethane resin as the binder resin A will now be described.

Polyurethane resins are reaction products of a diol and a diisocyanate.

The diol used for the polyurethane resin may be selected from the dihydric alcohols that can be used for an amorphous polyester or the above-described crystalline polyester.

The diisocyanate may be selected from those used in the method of (2-3) for preparing the monomer T. A trifunctional or more functional isocyanate may be used in addition to the diisocyanate.

Alternatively, a block copolymer produced by chemically binding a crystalline resin component and an amorphous resin component may be used as the binder resin A.

The block copolymer of a crystalline resin component (C) and an amorphous resin component (D) may be a CD-type diblock copolymer, a CDC-type triblock copolymer, a DCD-type triblock copolymer, or a CDCD . . . type multiblock copolymer.

For preparing such a block copolymer, a material for forming the crystalline portion of a crystalline resin component and a material for forming the amorphous portion of an amorphous resin component are independently prepared, followed by combining the two materials (two-step method), or ingredients for forming the crystalline portion and forming the amorphous portion are simultaneously added for preparation at one time (one-step method).

The method for producing the block copolymer may be selected from a variety of methods in view of the reactivity of terminal functional groups.

If both the crystallite resin component and the amorphous resin component are polyester resin, the block copolymer can be prepared by independently preparing these components and then binding the components optionally with a binder. If one of the polyesters has a higher acid value while the other has a higher hydroxy value, these can be bound without using a binder. This reaction may be performed at a temperature around 200° C.

The binder, if used, may be selected from among polyvalent carboxylic acids, polyhydric alcohols, polyvalent isocyanates, polyfunctional epoxy, and polyvalent acid anhydrides. The block copolymer may be synthesized by a dehydration reaction or an addition reaction using any of these binders.

If the crystalline resin component is polyester while the amorphous resin component is polyurethane, each of the components is prepared separately, and then the alcohol terminal of the polyester and the isocyanate terminal of the polyurethane are subjected to a urethanation reaction. Alternatively, the block copolymer may be synthesized by mixing a diol and a diisocyanate that can form a polyurethane, and an alcohol-terminated polyester, and heating the mixture. In the early state of the reaction, where the diol concentration and the isocyanate concentration are high, the diol and the isocyanate selectively react with each other to form a polyurethane. After the molecular weight of the polyurethane has increased to some extent, the isocyanate terminal of the polyurethane is subjected to a urethanation reaction with the alcohol terminal of the polyester to form the block copolymer.

If both the crystalline resin component and the amorphous resin component are vinyl resin, one of the components is polymerized into a vinyl polymer, and then the other is polymerized from an end of the vinyl polymer. The proportion of the crystalline resin portion in the block copolymer may be at least 50.0% by mass and not more than 90.0% by mass and is advantageously at least 60.0% by mass and not more than 85.0% by mass.

In an embodiment of the present disclosure, the toner particles may contain a wax. Examples of the wax include, but are not limited to, aliphatic hydrocarbon waxes, such as low-molecular-weight polyethylenes, low-molecular-weight polypropylenes, low-molecular-weight olefin copolymers, microcrystalline waxes, paraffin waxes, and Fischer-Tropsch waxes; oxides of aliphatic hydrocarbon waxes, such as polyethylene oxide waxes; waxes mainly containing a fatty acid ester, such as aliphatic hydrocarbon-based ester waxes; partially or fully deoxidized fatty acid esters, such as deoxidized carnauba waxes; partial esterification products of a fatty acid and a polyhydric alcohol, such as behenic acid monoglyceride; and methyl ester compounds having a hydroxy group produced by hydrogenating a vegetable oil.

Aliphatic hydrocarbon waxes and ester waxes are advantageously used in the present disclosure. If an ester wax is used, a trifunctional or more functional ester wax is advantageous, and a tetrafunctional or more functional ester, such as a hexafunctional or more functional ester wax, is more advantageous.

The trifunctional or more functional ester wax may be produced by condensation of a trifunctional or more functional acid with a long linear saturated alcohol or synthesis of a trifunctional or more functional alcohol and a long linear saturated fatty acid.

Trifunctional or more functional alcohols that can be used for producing the wax include glycerin, trimethylolpropane, erythritol, pentaerythritol, sorbitol, polyglycerin, ditrimethylolpropane, dipentaerythritol, and trispentaerythritol. Among these, branched structures, such as pentaerythritol and dipentaerythritol, are advantageous.

The long linear saturated fatty acid is represented by the general formula $C_nH_{2n+1}COOH$, and n is advantageously at least 5 and not more than 28. Examples of such a long linear saturated fatty acid include caproic acid, caprylic acid, octylic acid, nonylic acid, decanoic acid, dodecanonic acid, lauric acid, tridecanoic acid, myristic acid, palmitic acid, stearic acid, and behenic acid. In view of the melting point of the wax, myristic acid, palmitic acid, stearic acid, and behenic acid are advantageous.

The trifunctional or more functional acid may be trimellitic acid or butanetetracarboxylic acid.

The long linear saturated alcohol is represented by the general formula $C_nH_{2n+1}OH$, and n is advantageously at least 5 and not more than 28. Examples of such a long linear saturated alcohol include capryl alcohol, lauryl alcohol, myristyl alcohol, palmityl alcohol, stearyl alcohol, and behenyl alcohol. In view of the melting point of the wax, myristyl alcohol, palmityl alcohol, stearyl alcohol, and behenyl alcohol are advantageous.

The wax content in the toner particles may be at least 1.0% by mass and not more than 20.0% by mass, and is advantageously at least 2.0% by mass and not more than 15.0% by mass.

Advantageously, the wax has a maximum endothermic peak (measured by differential scanning calorimetry (DSC)) in the range of 60° C. to 120° C. More advantageously, it is at least 60° C. and not more than 90° C.

The toner particles may contain a coloring agent. Examples of the coloring agent include organic pigments, organic dyes, inorganic pigments, carbon blacks for black color, and magnetic particles. Also, other coloring agents conventionally used in toners may be used.

Yellow coloring agents include condensed azo compounds, isoindolinone compounds, anthraquinone compounds, azo metal complexes, methine compounds, and allyl amide compounds. More specifically, exemplary yellow coloring agents include C.I. Pigment Yellows 12, 13, 14, 15, 17, 62, 74, 83, 93, 94, 95, 109, 110, 111, 128, 129, 147, 155, 168, and 180.

Magenta coloring agents include condensed azo compounds, diketopyrrolopyrrole compounds, anthraquinone, quinacridone compounds, basic dye lakes, naphthol compounds, benzimidazolone compounds, thioindigo compounds, and perylene compounds. More specifically, exemplary magenta coloring agents include C.I. Pigment Reds 2, 3, 5, 6, 7, 23, 48:2, 48:3, 48:4, 57:1, 81:1, 122, 144, 146, 166, 169, 177, 184, 185, 202, 206, 220, 221, and 254.

Cyan coloring agents include copper phthalocyanine compounds and derivatives thereof, anthraquinone compounds, and basic dye lakes. More specifically, exemplary cyan coloring agents include C.I. Pigment Blues 1, 7, 15, 15:1, 15:2, 15:3, 15:4, 60, 62, and 66.

The coloring agent is selected in consideration of hue angle, chroma, lightness, light fastness, OHP transparency, and dispersion in the toner.

The coloring agent is added in a proportion of at least 1.0 part by mass and not more than 20.0 parts by mass relative to 100.0 parts by mass of the binder resin. If magnetic particles are used as the coloring agent, the proportion of the magnetic particles is, for example, at least 40.0 parts by mass and not more than 150.0 parts by relative to 100.0 parts by mass of the binding resin.

The toner may contain a charge control agent, if necessary. The charge control agent may be added externally to the toner particles. The charge control agent can stabilize the charge on the toner particles and allows the frictional charge to be optimally controlled according to the development system.

Although any known charge control agent can be used, a charge control agent capable of rapid charge and capable of keeping a stable charge quantity is advantageously used.

The charge control agent for controlling the toner to be negatively charged may be an organic metal compound or a chelate compound, and examples thereof include monoazo metal compounds, acetylacetone metal compounds, aromatic oxycarboxylic acids, aromatic dicarboxylic acids, and oxycarboxylic acid-based or dicarboxilic acid-based metal compounds. For controlling the toner to be positively charged, the charge controlling agent may be selected from among nigrosine, quaternary ammonium salts, higher fatty acid metal salts, diorganotin borates, guanidine compounds, and imidazole compounds.

The charge control agent may be added in a proportion of at least 0.01 part by mass and not more than 20.0 parts by mass, such as at least 0.5 part by mass and not more than 10.0 parts by mass, relative to 100.0 parts by mass of the toner particles.

Inorganic fine particles may be added as a fluidity improver to the toner particles. Examples of such inorganic fine particles include silica fine particles, titanium oxide fine particles, alumina fine particles, and fine particles of composite oxides thereof. Silica fine particles and titanium oxide fine particles are advantageous.

The silica fine particles may be a dry-process silica or fumed silica produced by vapor phase oxidation of a silicon halide or wet-process silica produced from water glass. Dry-process silica is advantageous. Dry-process silica has few silanol groups at the surfaces of and within the fine particles thereof and contains little $Na_2O$ or $SO_3^{2-}$. The dry-process silica used as the fluidity improver may be composite fine particles of a metal oxide and silica produced by using a metal halide, such as aluminum chloride or titanium chloride, together with a silicon halide.

Advantageously, the inorganic fine particles are added externally to the toner particles to improve the fluidity of the toner and equalize the charge on the toner. Advantageously, the inorganic fine particles are hydrophobized. This hydrophobization can improve the inorganic fine particles in terms of the ability of adjusting the charge on the toner, environmental stability, and properties under humid environment.

Examples of the agent used for hydrophobizing the inorganic fine particles include unmodified silicone varnish, a variety of modified silicone varnishes, unmodified silicone oil, a variety of modified silicone oils, silane compounds, silane coupling agents, other organosilicon compounds, and organotitanium compounds. These agents may be used singly or in combination.

Silicone oil-treated inorganic particles are advantageous. More advantageously, the inorganic fine particles are treated with silicone oil simultaneously with or after the hydrophobization thereof with a coupling agent.

The proportion of the inorganic fine particles added may be at least 0.1 part by mass and not more than 4.0 parts by mass relative to 100.0 parts by mass of the toner particles. Advantageously, it is at least 0.2 part by mass and not more than 3.5 parts by mass.

A method for producing toner particles in a dispersion medium containing high-pressure carbon dioxide will now be described by way of example.

In the step of (a), first, the binder resin A and the resin fine particles containing the resin B, and optionally a coloring agent, a wax, and other additives, are added into an organic solvent capable of dissolving the binder resin, and are dissolved or uniformly dispersed with a disperser, such as a homogenizer, a ball mill, a colloid mill, or an ultrasonic disperser. Then, the resin solution thus prepared is mixed with high-pressure carbon dioxide, thus forming droplets of the resin solution, covered with the resin fine particles. Advantageously, the high-pressure carbon dioxide is compressed to a pressure of at least 1.5 MPa. Liquid or supercritical carbon dioxide may be used solely as the dispersion medium, or may contain the organic solvent as another constituent of the dispersion medium. In this instance, it is advantageous that the high-pressure carbon dioxide and the organic solvent form a uniform phase.

The resin fine particles acting as a fine particulate dispersant, may be mixed with the resin solution or may be dispersed in the high-pressure carbon dioxide acting as the dispersion medium.

In the method according to the present disclosure, any method may be used for dispersing the resin fine particles in the dispersion medium containing high-pressure carbon dioxide. For example, the resin fine particles may be mixed with the resin solution, or directly dispersed in the dispersion medium containing high-pressure carbon dioxide in a vessel by using a stirrer or ultrasonic irradiation. Alternatively, a dispersion liquid of the resin fine particles in the organic solvent may be introduced into a vessel containing the dispersion medium containing high-pressure carbon dioxide with a high-pressure pump.

In the method of the present disclosure, the resin C used as a polymeric dispersant may be added when the resin solution is prepared. Alternatively, a solution of the resin C previously prepared by being dissolved in an organic solvent may be added with a high-pressure pump after forming the droplets of the resin solution covered with the resin fine particles.

In the present disclosure, it is important that the dispersion medium containing high-pressure carbon dioxide is defined by a single phase. When the droplets are formed by dispersing the resin solution in high-pressure carbon dioxide, part of the organic solvent in the droplets migrates to the dispersion medium. At this time, it is undesirable that the carbon dioxide phase and the organic solvent phase be separate. This causes the droplets to be unstable. It is therefore advantageous that the temperature and the pressure of the dispersion medium and the proportion of the resin solution to the high-pressure carbon dioxide be controlled so that carbon dioxide and the organic solvent can form a uniform phase.

The temperature and the pressure of the dispersion medium are determined also in view of the solubility of the resin solution components in the dispersion medium and easy formation of the droplets. For example, the resin and the wax in the resin solution may dissolve in the dispersion medium depending on the temperature and the pressure. In general, as the temperature and the pressure are reduced, the solubility of the solution components decreases, but the resulting droplets become likely to aggregate and cannot be easily granulated. On the other hand, as the temperature and the pressure are increased, the droplets become easy to granulate, and the solution components become more soluble in the dispersion medium. Accordingly, is advantageous that the temperature of the dispersion medium be at least 10° C. and not more than 50° C.

Also, the pressure in the vessel in which the droplets of the resin solution are formed is, advantageously, at least 1.5 MPa and not more than 6.0 MPa, such as at least 2.0 MPa and not more than 4.0 MPa. In the case of using a dispersion medium containing other constituents in addition to carbon dioxide, the pressure of the dispersion medium refers to the total pressure of all the constituents.

After completion of forming the droplets, high-pressure carbon dioxide is introduced to increase the pressure in the step of (b), thereby precipitating the resin C. The precipitation pressure at which the resin C is precipitated is measured by a method that will be described later. In the step of (c), the organic solvent remaining in the droplets is removed from the droplets through the dispersion medium by using high-pressure carbon dioxide. More specifically, high-pressure carbon dioxide is further mixed with the dispersion medium in which the droplets of the resin solution are dispersed, thereby extracting the remaining organic solvent from the droplets to the carbon dioxide phase, and the carbon dioxide containing the organic solvent is substituted by carbon dioxide having a still higher pressure.

For mixing high-pressure carbon dioxide with the dispersion medium, carbon dioxide having a higher pressure than the dispersion medium may be added to the dispersion medium, or the dispersion medium may be added to carbon dioxide having a lower pressure than the dispersion medium.

For substituting the carbon dioxide containing the organic solvent by carbon dioxide having a still higher pressure, high-pressure carbon dioxide may be introduced into the vessel kept at a constant pressure. This operation is performed while the resulting toner particles are being caught by a filter.

If the substitution by high-pressure carbon dioxide is so insufficient that the organic solvent remains in the dispersion medium, the organic solvent in the dispersion medium is condensed when the pressure in the vessel is reduced for collecting the toner particle. Consequently, the resulting toner particles can be dissolved in the organic solvent. Also, this may cause the toner particles to aggregate. Accordingly, the substitution by high-pressure carbon dioxide is continued until the organic solvent is completely removed. The proportion of high-pressure carbon dioxide may be at least 1 and not more than 100 relative to the volume of the dispersion medium, and advantageously at least 1 and not more than 50, such as at least 1 and not more than 30.

For removing the toner particles from the dispersion medium containing high-pressure carbon dioxide, the conditions of the vessel are returned to room temperature and normal pressure in a stroke, or the pressure in the vessel may be gradually reduced step by step by using independent pressure-controlled containers provided at some points in the system. The pressure reducing speed may be controlled within a range in which toner particles do not form bubbles.

The organic solvent and carbon dioxide used herein can be recycled.

The method for producing resin particles according to an embodiment of the present disclosure includes the following steps (a), (b), and (c):

(a) mixing a binder resin A, resin fine particles containing a resin B, a resin C, an organic solvent, and carbon dioxide, thereby forming a droplet of a resin solution containing the binder resin A, the droplet being covered with the resin fine particles;

(b) applying a pressure by introducing carbon dioxide, thereby precipitating the resin C at the surface of the droplet; and (c) passing pressurized carbon dioxide so as to remove the organic solvent from the resin droplet with the carbon dioxide.

The resins A, B, and C are the same as those used in the method for producing the toner particles. The method of the present embodiment can be performed in the same manner as in the method for producing the toner particles.

The measurements of physical properties of the toner particle and the resin particle disclosed herein will now be described.

Measurement of Precipitation Pressure of Resin C

The resin C is dissolved in the organic solvent used in the method disclosed herein. The resin C concentration in the solution is 2.5% by mass. The solution is then introduced into a pressure vessel that is adjusted to a temperature at which the droplets are formed in step (a) and provided with sapphire window on the front and the back side thereof. Then, carbon dioxide is introduced into the vessel to apply a pressure with stirring at that temperature. After the pressure has reached 0.5 MPa, the introduction of carbon dioxide is stopped, followed by stirring for 15 minutes. Then, it is checked through the sapphire windows whether the resin C has been precipitated. The sapphire window on the rear side of the vessel is irradiated with light. If the light is transmitted to the sapphire window on the front side, precipitation is determined to be insufficient. Carbon dioxide is repeatedly introduced in increments of 0.5 MPa, and the pressure at which transmitted light on both the sapphire windows disappears is defined as the precipitation pressure of the resin C.

Calculations of $SP_A$ (SP Value of Binder Resin A), $SP_X$ (SP Value of Monomer X), $SP_Y$ (SP Value of Monomer Y), Polarity Parameter $P_Y$ of SP Value of Monomer Y, Polarity Parameter $P_Z$ of SP Value of Monomer Z Calculation of $SP_A$:

The proportions of the components of the binder resin A are determined by $^1$H-NMR analysis. The analysis is performed under the following conditions:
Analyze: FT NMR JNM-EX400 (manufactured by JEOL)
Measurement frequency: 400 MHz
Pulse width: 5.0 µs
Frequency range: 10500 Hz
Integration count: 64
Measurement temperature: 30° C.

A sample tube of 5 mm in inner diameter is charged with 50 mg of binder resin A, and deuterated chloroform ($CDCl_3$) is added as a solvent. Thus, the binder resin is dissolved at 40° C. within a thermostatic oven to yield a measurement sample.

The resulting measurement sample is subjected to $^1$H-NMR measurement, and the components of the binder resin A are identified from the obtained NMR spectrum. The proportions of the components are calculated from the proportions of the protons at the peaks derived from the respective components.

The SP value (($J/cm^3)^{1/2}$), or $SP_A$, of the binder resin A is calculated from the dispersion parameter, the polarity parameter, the hydrogen bonding parameter of the SP value and the molar volume of the binder resin A, stored in the database of a commercially available software program (HSPiP 4th Edition 4. 1. 03), and the mole ratio by using the software program. If there is no data of a component in the database, the structural formula of the component is converted to a character string based on the simplified molecular input line entry specification (SMILES) syntax, and the dispersion parameter, the polarity parameter, and the hydrogen bonding parameter are calculated by using the software program.

Calculation of $SP_X$, $SP_Y$, $P_Y$, and $P_Z$:

If the database includes the SP values $SP_X$ and $SP_Y$ of the monomers X and Y, the polarity parameter $P_X$ of the monomer X, and the polarity parameter $P_Z$ of the monomer Z, the corresponding values in the database are applied to the calculation of the SP value. If there is no data of a monomer in the database, the structural formula of the monomer is converted to a character string based on the SMILES syntax, and required components of the SP values are calculated by using the software program.

Measurement of Number Average Molecular Weight (Mn) and Weight Average Molecular Weight (Mw)

The molecular weights (Mn, Mw) of the toner particle, the resin particle, and the tetrahydrofuran (THF)-soluble portions of the ingredients thereof are measured by gel permeation chromatography (GPC) as below.

First, the sample is dissolved in THF at room temperature over a period of 24 hours. The resulting solution is filtered through a solvent-resistant membrane filter "Maishori Disk" of 0.2 µm in pore size (manufacture by Tosoh Corporation) to yield a sample solution. The sample solution is adjusted so that the concentration of THF-soluble component will be about 0.8% by mass. The resulting sample solution is subjected to measurement under the following conditions:
Apparatus: HLC 8120 GPC (detector: RI) (manufactured by Tosoh Corporation)
Columns: combination of 7 columns of Shodex series KF-801, KF-802, KF-803, KF-804, KF-805, KF-806, and KF-807 (manufactured by Showa Denko)
Eluent: tetrahydrofuran (THF)
Flow rate: 1.0 mL/min
Oven temperature: 40.0° C.
Volume of sample injected: 0.10 mL For calculating the molecular weight of the sample, a molecular weight calibration curve is prepared by using standard polystyrene resins (for example, TSK Standard Polystyrenes F-850, F-450, F-288, F-128, F-80, F-40, F-20, F-10, F-4, F-2, F-1, A-5000, A-2500, A-1000, and A-500, produced by Tosoh).

Measurement of Particle Sizes of Fine Particulate Resin, Wax, and Coloring Agent The volume average particle sizes (µm or nm) of these materials are measured in the range of 0.001 µm to 10 µm with a particle size distribution analyzer Microtrac HRA (X-100) (manufactured by Nikkiso). Each sample to be measured is diluted with water.

Measurement of Weight Average Particle Size (D4) and Number Average Particle Size (D1) of Toner Particles and Resin Particles The D4, D1, and D4/D1 of the toner particles and the resin particles are determined as below. This measurement is performed by a pore electric resistance method with a 100 µm-aperture tube, using a precise particle size distribution analyzer "Coulter Counter Multisizer 3" (registered trademark) manufactured by Beckman Coulter. For setting the measurement conditions and analyzing the measured data, a software program Multisizer 3 Version 3. 51 supplied from Beckman Coulter with the analyzer is used. The effective number of measurement channels is 25,000.

The electrolyte used for the measurement may be prepared by dissolving highest-quality sodium chloride in ion exchanged water to about 1% by mass, and, such an electrolyte is available as, for example, ISOTON II (produced by Beckman Coulter).

Before measurement and analysis, the software program is set up as below. The total count in the control mode is set to 50,000 particles on the "standard measurement (SOM) change screen (in Japanese)" of the software. Also, the number of measurements is set to 1, and Kd is set to a value obtained by use of "10.0 µm standard particles" (produced by Beckman Coulter). On pressing the threshold/noise level measurement button, the threshold and noise level are automatically set. The Current is set to 1600 pA; the Gain, to 2; and the electrolyte, to ISOTON II. A check mark is placed at the statement of "flush of aperture tube after measurement (in Japanese)".

On the "Pulse-to-Particle Size Conversion Setting Screen (in Japanese)" of the software, the bin distance is set to logarithmic particle size, the particle size bin to 256 particle size bins, and the particle size range to 2 µm to 60 µm.

Specifically, the measurement is performed according to the following procedure:

(1) About 200 mL of the electrolyte is placed in a Multisizer-3-specific 250 mL glass round bottom beaker, and stirred with a stirrer rod counterclockwise at 24 revolutions per second with the beaker set on a sample stand. The dirt and air bubbles in the aperture tube are removed by the "Aperture Flush" function of the software.

(2) About 30 mL of the electrolyte is placed in a 100 mL glass flat bottom beaker. To the electrolyte is added about 0.3 mL of dispersant, "CONTAMINON N" diluted to about 3 times its mass with ion exchanged water. CONTAMINON N is a 10% by mass aqueous solution of a pH 7 neutral detergent for precision measurement instruments, containing a nonionic surfactant, an anionic surfactant, and an organic builder, produced by Wako Pure Chemical Industries.

(3) An ultrasonic dispersion system Tetora 150 (manufactured by Nikkaki Bios) is prepared which has an electric power of 120 W and contains two oscillators having an oscillation frequency of 50 kHz in a state where their phases are shifted by 180°. The water tank of the ultrasonic dispersion system is charged with about 3.3 L of ion exchanged water, and about 2 mL of CONTAMINON N is further added into the water tank.

(4) The beaker of the above (2) is set to a beaker securing hole of the ultrasonic dispersion system, and the ultrasonic dispersion system is started. Then, the level of the beaker is adjusted so that the resonance of the surface of the electrolyte in the beaker can be largest.

(5) In a state where ultrasonic waves are applied to the electrolyte in the beaker of (4), about 10 mg of toner is added little by little to the electrolyte and dispersed. Such ultrasonic dispersion is further continued for 60 seconds. For the ultrasonic dispersion, the water temperature in the water tank is appropriately controlled in the range of 10° C. to 40° C.

(6) The electrolyte of (5), in which the toner particles are dispersed, is dropped with a pipette into the round bottom beaker of the above (1) set on the sample stand to adjust the measurement concentration to be about 5%. Then, the measurement is performed until the number of measured particles comes to 50,000.

(7) The measurement data is subjected to analysis of the above-described software to calculate the weight average particle size (D4) and the number average particle size (D1). "Average size" on the "Analysis/Volume Statistic Value (Arithmetic Mean) screen (in Japanese)" in a state where graph/volume % is set on the software refers to the weight average particle size (D4), and "Average size" on the "Analysis/Number Statistic Value (Arithmetic Mean) screen (in Japanese)" in a state where graph/number % is set on the software refers to the number average particle size (D1). D4/D1 is defined as the particle size distribution value.

Measurement of Aspect Ratios of Toner Particle Aggregates and Resin Particle Aggregates Aggregates among toner particles or resin particles are evaluated by measuring the aspect ratio of the aggregates.

The aspect ratio is measured by using a flow particle image analyzer FPIA-3000 (manufactured by Sysmex) under the same conditions as the measurement and analysis conditions set for calibration. FPIA-3000 takes a still picture of moving particles and analyzes the picture. The sample added into the sample chamber is delivered to a flat sheath flow cell with a sample suction syringe. The sample delivered to the flat sheath flow cell forms a flat flow by being surrounded by the sheath liquid. The sample in the flat sheath flow cell is irradiated with strobe light at intervals of 1/60 s so that a still picture of flowing particles can be taken. Since the sample flow is flat, it is photographed in a focused state. The picture of the particles is taken with a CCD camera and image-processed at resolutions of 512×512 (0.37 µm×0.37 µm per pixel). Then, the contour of the particles is extracted, and the maximum length ($D_{max}$) and the maximum vertical length ($D_{v-max}$) of the contour are measured.

The aspect ratio is determined from the maximum length ($D_{max}$) and the maximum vertical length ($D_{v-max}$). The aspect ratio is defined by the quotient of the maximum length ($D_{max}$) divided by the maximum vertical length ($D_{v-max}$), and is hence calculated by using the equation: aspect ratio=$D_{max}/D_{v-max}$. The maximum length ($D_{max}$) is the largest of the lengths measured between two points on the contour, and the maximum vertical length ($D_{v-max}$) is the length between two imaginary tangents to the contour that are parallel to an imaginary line defining the maximum length ($D_{max}$).

When only a few of the particles form an aggregate and the contour is nearly circular, the aspect ratio is close to 1; as a larger number of the particles form an aggregate and the contour is in a shape more similar to a needle, the aspect ratio increases.

More specifically, the measurement is performed according to the following procedure. First, a glass vessel is charged with about 20 mL of ion exchanged water from which impure solids have been removed. To this water is added about 0.2 mL of dispersant, "CONTAMINON N" diluted to about 3 times its mass with ion exchanged water. CONTAMINON N is a 10% by mass aqueous solution of a pH 7 neutral detergent for precision measurement instruments, containing a nonionic surfactant, an anionic surfactant, and an organic builder, produced by Wako Pure Chemical Industries. About 0.02 g of the measurement sample was further added, and the contents in the vessel are agitated for 2 minutes with an ultrasonic dispersion system to yield a dispersion liquid. At this time, the dispersion liquid is cooled to a temperature of 10° C. to 40° C. as needed. The ultrasonic dispersion system may be a desktop ultrasonic cleaner disperser having an oscillation frequency of 50 kHz and an electric power of 150 W, such as VS-150 (manufactured by Velvo-clear). A predetermined amount of ion exchanged water is placed into the water tank of the ultrasonic dispersion system, and about 2 mL of CONTAMINON N is further added into the water tank.

For the measurement, a flow particle image analyzer equipped with a standard objective lens with a magnification of 10 times is used, and Particle Sheath PSE-900A (manufactured by manufactured by Sysmex) is used as the sheath liquid. The dispersion liquid prepared according to the above-described procedure is introduced into the flow particle image analyzer, and 3000 particles are measured in the HPF measurement mode and total count mode. Thus, the maximum length ($D_{max}$) and the maximum vertical length ($D_{v\text{-}max}$) of the sample are measured under the conditions where the binarization threshold for particle analysis is set to 85% and the analysis particle size is limited to a circle equivalent diameter of 1.985 μm to less than 39.69 μm. Before measurement, the analyzer is subjected to automatic focus adjustment with standard latex particles (for example, RESEARCH AND TEST PARTICLES Latex Microsphere Suspensions 5200A (manufactured by Duke Scientific) diluted with ion exchanged water). Advantageously, such focus adjustment is performed every 2 hours from the start of the measurement.

In the following Examples, a flow particle image analyzer calibrated by Sysmex and certified by Sysmex was used. The analyzer was used under the same measurement and analysis conditions as those when the certificate was issued, except that the analysis particle size was limited to a circle equivalent diameter of 1.985 μm to less than 39.69 μm.

EXAMPLES

The subject matter of the present disclosure will be further described in detail with reference to Production Examples and Examples, but is not limited to the these Examples. In the following Examples, "%" and "part(s)" are on a mass basis unless otherwise specified.

Synthesis of Resin A1
While nitrogen was introduced, a two-neck flask dried by heating was charged with the following ingredients:
  1,6-Hexanediol: 76.0 parts;
  Sebacic acid: 124.0 parts; and
  Dibutyltin oxide: 0.1 part.
The interior of the flask was purged with nitrogen by reducing pressure, and the contents therein were stirred at 180° C. for 6 hours. Then, the temperature was gradually increased to 230° C. under reduced pressure with stirring, and was held at that temperature for 2 hours. When the contents in the flask turned sticky, the reaction was stopped by air cooling. Thus, crystalline polyester 1 was synthesized.
  Crystalline Polyester 1: 210.0 parts;
  Xylylene diisocyanate: 56.0 parts;
  Cyclohexane dimethanol: 34.0 parts; and
  Tetrahydrofuran: 300.0 parts.
These ingredients were introduced into a reaction vessel equipped with a stirrer and a thermometer while the vessel is being purged with nitrogen. The mixture was heated to 50° C. and subjected to urethanation over a period of 15 hours. The solvent, or tetrahydrofuran, was removed by evaporation to yield binder resin A1. The Mn and Mw of binder resin A1 were 12,300 and 31,400, respectively. The SP value ($SP_A$) of binder resin A1 determined by calculation was 18.5.

Synthesis of Unsaturated Polyester 1
While nitrogen was introduced, a two-neck flask dried by heating was charged with the following ingredients:
  ε-Caprolactone: 200.0 parts;
  Stearyl alcohol: 28.1 parts; and
  Dibutyltin oxide: 0.1 part.
The interior of the flask was purged with nitrogen by reducing pressure, and the contents therein were stirred at 180° C. for 2 hours. Then, the temperature was gradually increased to 230° C. under reduced pressure with stirring, and was held at that temperature for 2 hours. When the contents in the flask turned sticky, the reaction was stopped by air cooling. Thus, a polyester having a hydroxy group at one end was synthesized. Then, 150.0 parts of tetrahydrofuran was added to dissolve the polyester, and 25.9 parts of triethylamine was added to the solution. Subsequently, 38.8 parts of acryloyl chloride was slowly dropped under ice bath cooling. After dropping, the liquid was stirred for 3 hours under ice bath cooling, and then further stirred for another 2 hours. Then, the solvent was removed by evaporation, and the product was precipitated with methanol to yield unsaturated polyester 1. The Mn and Mw of unsaturated polyester 1 are shown in Table 1.

Synthesis of Unsaturated Polyesters 2 to 4
Unsaturated polyesters 2 to 4 were synthesized in the same manner as unsaturated polyester 1, except that the amounts of ingredients used were changed as shown in Table 1. The Mn and Mw of unsaturated polyesters 2 to 4 are shown in Table 1.

TABLE 1

|  | Stearyl alcohol Charge (parts by mass) | ε-Caprolactone Charge (parts by mass) | Triethylamine Charge (parts by mass) | Acryloyl chloride Charge (parts by mass) | Mn | Mw |
|---|---|---|---|---|---|---|
| Unsaturated polyester 1 | 28.1 | 200.0 | 25.9 | 38.8 | 2200 | 3000 |
| Unsaturated polyester 2 | 68.4 | 200.0 | 62.9 | 94.4 | 1100 | 1500 |
| Unsaturated polyester 3 | 4.4 | 200.0 | 4.0 | 6.0 | 12800 | 18000 |
| Unsaturated polyester 4 | 3.5 | 200.0 | 3.3 | 4.9 | 15700 | 22000 |

Preparation of Silicone Monomers 1 to 4

Commercially available silicone monomers 1 to 4, represented by the following formula (ii) were prepared. Specific structures of Silicone Monomers 1 to 4 are shown in Table 2.

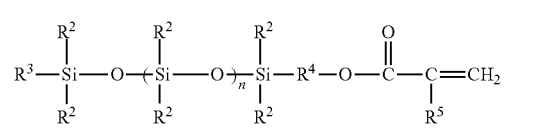

(ii)

TABLE 2

| | Product code | Manufacturer | Degree of polymerization: n | $R^2$ | $R^3$ | $R^4$ | $R^5$ | Mn |
|---|---|---|---|---|---|---|---|---|
| Silicone monomer 1 | FM-0721 | JNC | 65 | Methyl | Methyl | Propylene | Methyl | 5000 |
| Silicone monomer 2 | X-22-2426 | Shin-Etsu Chemical | 160 | Methyl | Methyl | Propylene | Methyl | 12000 |
| Silicone monomer 3 | FM-0711 | JNC | 11 | Methyl | Methyl | Propylene | Methyl | 1000 |
| Silicone monomer 4 | X-22-2475 | Shin-Etsu Chemical | 3 | Methyl | Methyl | Propylene | Methyl | 420 |

Preparation of Monomers Z1 to Z6

The commercially available monomers shown in Table 3 were prepared as monomers Z1 to Z6, each having two polymerizable unsaturated groups in the molecule thereof. The Mn and the dispersion parameter ($P_Z$) of the SP value of each of Monomers Z1 to Z6 are shown in Table 3.

TABLE 3

| | Composition | Product code | Manufacturer | Mn | Pz |
|---|---|---|---|---|---|
| Monomer Z1 | Polypropylene glycol diacrylate | APG400 | Shin-Nakamura Chemical | 540 | 5.3 |
| Monomer Z2 | Tripropylene glycol diacrylate | APG200 | Shin-Nakamura Chemical | 300 | 4.7 |
| Monomer Z3 | Polypropylene glycol diacrylate | APG700 | Shin-Nakamura Chemical | 810 | 6.1 |
| Monomer Z4 | Polyethylene glycol diacrylate | A-1000 | Shin-Nakamura Chemical | 1110 | 10.2 |
| Monomer Z5 | 1,9-Nonanediol diacrylate | A-NOD-N | Shin-Nakamura Chemical | 270 | 3.9 |
| Monomer Z6 | Divinylbenzene | — | Kishida Chemical | 130 | 2.8 |

Preparation of Resin B1 and Resin Fine Particle Dispersion Liquid 1

Silicone monomer 4 was used as the monomer X, and Placcel FA10L (produced by Daicel) was used as the monomer Y. Placcel FA10L is unsaturated fatty acid hydroxyalkyl ester-modified ε-caprolactone represented by the following formula (iii):

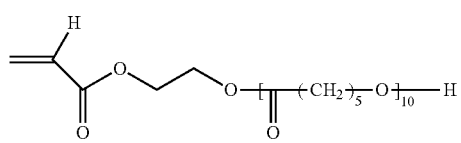

(iii)

Since Placcel FA10L contains toluene, the toluene was removed before use. The calculated SP value ($SP_X$) of silicone monomer 4 was 13.5, and the calculated SP value ($SP_Y$) and polarity parameter ($P_Y$) of Placcel FA10L were 18.1 and 3.6, respectively.

While nitrogen was introduced, a two-neck flask dried by heating was charged with the following ingredients and 800.0 parts of toluene, and the contents in the flask were completely dissolved by being heated to 70° C. to yield monomer composition 1.

Monomer X (silicone monomer 4): 30.0 parts;
Monomer Y (Placcel FA10L): 40.0 parts;
Styrene: 16.0 parts;
Methacrylic acid: 10.0 parts; and
Monomer Z1 (polypropylene glycol diacrylate): 4.0 parts.

Monomer composition 1 was warmed to 25° C. with stirring at 250 rpm and was then subjected to bubbling with nitrogen for 30 minutes. Subsequently, 0.6 part of azobis(methoxydimethylvaleronitrile) was added as a polymerization initiator. Then, the mixture was subjected to a reaction for 6 hours by heating at 75° C., and then further heated to 80° C. for further reaction for another 1 hour. Then, the flask was cooled with air to yield a dispersion of coarse particles of resin B1.

The resulting dispersion of coarse particulate resin B1 was placed into a temperature-controllable stirring tank. Then, the dispersion was transferred to a disperser CLEAR SS5 (manufactured by M Technique) at a flow rate of 35 g/min with a pump and treated into a dispersion of fine particulate resin B1. In CLEAR SS5, the dispersion was treated under the conditions where the rotational speed of the ring-like disk of CLEAR SS5 was set at 15.7 m/s in terms of outermost peripheral speed with a gap of 1.6 μm between the rotating ring-like disk and the fixed ring-like disk. The temperature of the stirring tank was controlled so that the temperature of the liquid that had been treated with CLEAR SS5 could be not more than 40° C.

Fine particulate resin B1 and toluene in the dispersion were separated from each other by centrifugation. The centrifugation was performed under the following conditions:

Centrifuge: H-9R (manufactured by KOKUSAN)
Rotor: $B_{N1}$ Rotor (manufactured by KOKUSAN)
Preset internal temperature: 4° C.
Rotational speed: 16500 rpm
Period: 2.5 hours The supernatant liquor was removed to yield a concentrated dispersion of fine particulate resin B1.

The concentrated dispersion of the fine particulate resin B1 and acetone were introduced into a beaker equipped with a stirrer, and the fine particulate resin B1 was dispersed in the acetone with a high-power homogenizer VCX-750. Then, acetone was further added to the dispersion to yield resin fine particle dispersion 1 with a solids content of 20.0% by mass. The volume average particle size of the resin fine particles in dispersion 1 was 0.14 μm.

Preparation of Resins B2 to B10 and Resin Fine Particle Dispersion Liquids 2 to 10

Resins B2 to B10 and resin fine particle dispersion liquids 2 to 10 were prepared in the same manner as resin B1 and resin fine particle dispersion 1, except that the ingredients used and the amounts thereof were changed as shown in Table 4. The volume average particle size of the resin fine particles in each of resin fine particle dispersion liquids 2 to 10 is shown in Table 4.

TABLE 4

| Dispersion liquid of resin fine particles | Resin B | Monomer X Type | Monomer X Proportion (Parts by mass) | Monomer Y Type | Monomer Y Proportion (Parts by mass) | Monomer Z Type | Monomer Z Proportion (Parts by mass) | Styrene Proportion (Parts by mass) | Methacrylic acid Proportion (Parts by mass) | Volume average particle size (μm) |
|---|---|---|---|---|---|---|---|---|---|---|
| Dispersion liquid 1 | Resin B1 | Silicone monomer 4 | 30.0 | Placcel FA10L | 40.0 | Monomer Z1 | 4.0 | 16.0 | 10.0 | 0.14 |
| Dispersion liquid 2 | Resin B2 | Silicone monomer 4 | 30.0 | Placcel FA10L | 40.0 | Monomer Z2 | 4.0 | 16.0 | 10.0 | 0.15 |
| Dispersion liquid 3 | Resin B3 | Silicone monomer 4 | 30.0 | Placcel FA10L | 40.0 | Monomer Z3 | 4.0 | 16.0 | 10.0 | 0.14 |
| Dispersion liquid 4 | Resin B4 | Silicone monomer 4 | 30.0 | Placcel FA10L | 40.0 | Monomer Z4 | 4.0 | 16.0 | 10.0 | 0.13 |
| Dispersion liquid 5 | Resin B5 | Silicone monomer 4 | 30.0 | Placcel FA10L | 40.0 | Monomer Z5 | 4.0 | 16.0 | 10.0 | 0.12 |
| Dispersion liquid 6 | Resin B6 | Silicone monomer 4 | 30.0 | Placcel FA10L | 40.0 | Monomer Z6 | 4.0 | 16.0 | 10.0 | 0.15 |
| Dispersion liquid 7 | Resin B7 | Silicone monomer 4 | 30.0 | Placcel FA10L | 40.0 | Monomer Z1 | 2.0 | 18.0 | 10.0 | 0.13 |
| Dispersion liquid 8 | Resin B8 | Silicone monomer 4 | 30.0 | Placcel FA10L | 40.0 | Monomer Z1 | 0.5 | 19.5 | 10.0 | 0.12 |
| Dispersion liquid 9 | Resin B9 | Silicone monomer 4 | 30.0 | Placcel FA10L | 40.0 | Monomer Z1 | 8.0 | 12.0 | 10.0 | 0.14 |
| Dispersion liquid 10 | Resin B10 | Silicone monomer 4 | 30.0 | Placcel FA10L | 40.0 | Monomer Z1 | 12.0 | 8.0 | 10.0 | 0.13 |

Synthesis of Resin C1

Silicone monomer 1 was used as the monomer S, and unsaturated polyester 1 was used as the monomer T. A reaction vessel equipped with a stirrer and a thermometer was charged with the following ingredients while being purged with nitrogen:
Monomer S (silicone monomer 1): 30.0 parts;
Monomer T (unsaturated polyester 1): 50.0 parts;
Styrene: 10.0 parts;
Methacrylic acid: 10.0 parts;
Azobisisobutyronitrile (initiator): 0.20 part; and
Toluene: 200.0 parts.

The contents of the reaction vessel were heated to 80° C. and subjected to a reaction for 5 hours at this temperature. Then, the contents were cooled to room temperature and precipitated with methanol to yield resin C1. The physical properties of the resulting resin C1 are shown in Table 5. The precipitation pressure was measured at 30° C.

TABLE 5

| Resin C | Monomer S Type | Monomer S Proportion (Parts by mass) | Monomer T Type | Monomer T Proportion (Parts by mass) | Styrene Proportion (Parts by mass) | Methacrylic acid Proportion (Parts by mass) |
|---|---|---|---|---|---|---|
| Resin C1 | Silicone monomer 1 | 30.0 | Unsaturated polyester 1 | 50.0 | 10.0 | 10.0 |
| Resin C2 | Silicone monomer 1 | 30.0 | Unsaturated polyester 1 | 50.0 | 10.0 | 10.0 |
| Resin C3 | Silicone monomer 1 | 30.0 | Unsaturated polyester 1 | 50.0 | 10.0 | 10.0 |
| Resin C4 | Silicone monomer 1 | 30.0 | Unsaturated polyester 1 | 50.0 | 10.0 | 10.0 |
| Resin C5 | Silicone monomer 1 | 30.0 | Unsaturated polyester 1 | 50.0 | 10.0 | 10.0 |
| Resin C6 | Silicone monomer 1 | 30.0 | Unsaturated polyester 1 | 50.0 | 10.0 | 10.0 |
| Resin C7 | Silicone monomer 1 | 22.0 | Unsaturated polyester 1 | 50.0 | 18.0 | 10.0 |
| Resin C8 | Silicone monomer 1 | 18.0 | Unsaturated polyester 1 | 50.0 | 22.0 | 10.0 |
| Resin C9 | Silicone monomer 1 | 48.0 | Unsaturated polyester 1 | 30.0 | 12.0 | 10.0 |
| Resin C10 | Silicone monomer 1 | 52.0 | Unsaturated polyester 1 | 30.0 | 8.0 | 10.0 |
| Resin C11 | Silicone monomer 1 | 30.0 | Unsaturated polyester 1 | 23.0 | 37.0 | 10.0 |
| Resin C12 | Silicone monomer 1 | 30.0 | Unsaturated polyester 1 | 18.0 | 42.0 | 10.0 |
| Resin C13 | Silicone monomer 1 | 25.0 | Unsaturated polyester 1 | 58.0 | 7.0 | 10.0 |
| Resin C14 | Silicone monomer 1 | 25.0 | Unsaturated polyester 1 | 61.0 | 4.0 | 10.0 |
| Resin C15 | Silicone monomer 2 | 30.0 | Unsaturated polyester 1 | 50.0 | 10.0 | 10.0 |
| Resin C16 | Silicone monomer 3 | 30.0 | Unsaturated polyester 1 | 50.0 | 10.0 | 10.0 |
| Resin C17 | Silicone monomer 1 | 30.0 | Unsaturated polyester 2 | 50.0 | 10.0 | 10.0 |
| Resin C18 | Silicone monomer 1 | 30.0 | Unsaturated polyester 3 | 50.0 | 10.0 | 10.0 |
| Resin C19 | Silicone monomer 1 | 30.0 | Unsaturated polyester 4 | 50.0 | 10.0 | 10.0 |
| Resin C20 | Silicone monomer 1 | 30.0 | Unsaturated polyester 1 | 50.0 | 10.0 | 10.0 |
| Resin C21 | Silicone monomer 1 | 30.0 | Unsaturated polyester 1 | 50.0 | 10.0 | 10.0 |
| Resin C22 | Silicone monomer 1 | 30.0 | Unsaturated polyester 1 | 50.0 | 10.0 | 10.0 |

TABLE 5-continued

| Resin C | Initiator Proportion (Parts by mass) | Reaction temperature (° C.) | Reaction time (h) | Mw | Mw/Mn | Precipitation pressure (MPa) | Solubility in acetone |
|---|---|---|---|---|---|---|---|
| Resin C1 | 0.20 | 80 | 5 | 202,300 | 2.3 | 3.0 | Soluble |
| Resin C2 | 0.74 | 80 | 5 | 54,800 | 2.5 | 3.0 | Soluble |
| Resin C3 | 0.11 | 90 | 2 | 496,300 | 3.5 | 3.0 | Soluble |
| Resin C4 | 0.38 | 80 | 5 | 108,200 | 2.4 | 3.0 | Soluble |
| Resin C5 | 0.14 | 80 | 5 | 279,700 | 2.6 | 3.0 | Soluble |
| Resin C6 | 0.20 | 90 | 3 | 198,800 | 4.8 | 3.0 | Soluble |
| Resin C7 | 0.20 | 80 | 5 | 209,100 | 2.7 | 3.0 | Soluble |
| Resin C8 | 0.20 | 80 | 5 | 203,600 | 2.6 | 3.0 | Soluble |
| Resin C9 | 0.20 | 80 | 5 | 200,500 | 2.4 | 3.5 | Soluble |
| Resin C10 | 0.20 | 80 | 5 | 201,500 | 2.5 | 3.5 | Soluble |
| Resin C11 | 0.20 | 80 | 5 | 199,100 | 2.6 | 4.0 | Soluble |
| Resin C12 | 0.20 | 80 | 5 | 203,100 | 2.7 | 4.0 | Soluble |
| Resin C13 | 0.20 | 80 | 5 | 206,400 | 2.8 | 3.0 | Soluble |
| Resin C14 | 0.20 | 80 | 5 | 197,600 | 2.4 | 3.0 | Soluble |
| Resin C15 | 0.20 | 80 | 5 | 202,300 | 2.3 | 3.0 | Soluble |
| Resin C16 | 0.20 | 80 | 5 | 204,900 | 2.6 | 3.0 | Soluble |
| Resin C17 | 0.20 | 80 | 5 | 196,900 | 2.8 | 3.0 | Soluble |
| Resin C18 | 0.20 | 80 | 5 | 210,000 | 2.7 | 3.0 | Soluble |
| Resin C19 | 0.20 | 80 | 5 | 224,400 | 2.6 | 3.0 | Soluble |
| Resin C20 | 1.04 | 80 | 5 | 39,800 | 2.4 | 3.0 | Soluble |
| Resin C21 | 0.08 | 80 | 5 | 506,100 | 2.5 | 3.0 | Soluble |
| Resin C22 | 0.20 | 95 | 3 | 203,000 | 5.5 | 3.0 | Soluble |

Synthesis of Resins C2 to C22

Resins C2 to C22 were synthesized in the same manner as resin C1, except that the ingredients used and the amounts thereof were changed as shown in Table 5. Physical properties of resins C1 to C22 are shown in Table 5.

Synthesis of Comparative Resin C1

A reaction vessel equipped with a stirrer and a thermometer was charged with the following ingredients while being purged with nitrogen:

Silicone Monomer 4: 134.0 parts;
Ether monomer: 66.0 parts;
Azobisisobutyronitrile: 1.0 part; and
Toluene: 100.0 parts.

The contents of the reaction vessel were heated to 80° C. and subjected to a reaction for 5 hours at this temperature. Then, the contents were cooled to room temperature and precipitated with methanol to yield comparative resin C1. Comparative resin C1 had a Mw of 32,800 and a Mw/Mn of 2.5. Although measurement of the precipitation pressure was attempted, comparative resin C1 was not precipitated even at 8.0 MPa. It was soluble in acetone.

The ether monomer used was Light Acrylate 130A (produced by Kyoeisha Chemical), and the structure thereof is represented by the following formula (iv):

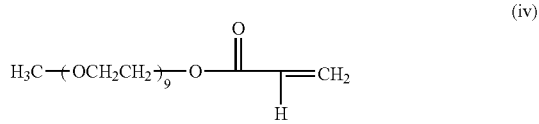

(iv)

Synthesis of Comparative Resin C2

To a reaction vessel equipped with a thermometer and a stirrer were added 683.0 parts of water, 11.0 parts of sodium salt of methacrylic acid EO adduct sulfate (ELEMINOL RS-30, produced by Sanyo Chemical Industries), 139.0 parts of styrene, 138.0 parts of methacrylic acid, 184.0 parts of butyl acrylate, and 1.0 part of ammonium persulfate. The contents of the vessel were stirred at 400 rpm for 15 minutes to yield a white emulsion. Subsequently, the contents were warmed to 75° C. and subjected to a reaction at this temperature for 5 hours. After 30.0 parts of 1.0 mass % ammonium persulfate aqueous solution was further added, the contents were matured at 75° C. for 5 hours to yield an aqueous dispersion liquid of a vinyl resin (copolymer of sodium salt of styrene-methacrylic acid-butyl methacrylate-methacrylic acid EO adduct sulfate). The aqueous dispersion liquid was dried at 130° C. for 2 hours in a vacuum dryer to yield comparative resin C2. Comparative resin C2 had a Mw of 29,800 and a Mw/Mn of 2.4. When the precipitation pressure was measured, comparative resin C2 was precipitated at 8.0 MPa. It was soluble in acetone.

Preparation of Resin C Solutions 1 to 22 and Comparative Resin C Solutions 1 and 2

Into a beaker equipped with a stirrer were added 50.0 parts of acetone and 50.0 parts of any of resins C1 to C22 and comparative resins C1 and C2, and the contents were stirred at 40° C. until the contents were completely dissolved. Thus, resin C solutions 1 to 22 and comparative resin C solutions 1 and 2 were prepared.

Preparation of Coloring Agent Dispersion Liquid

C.I. Pigment Blue 15:3: 100.0 parts;
Acetone: 150.0 parts; and
Glass beads (1 mm): 300.0 parts.

The above ingredients were added into a heat-resistant glass vessel and dispersed for 5 hours with a paint shaker (manufactured by Toyo Seiki). The glass beads were removed with a nylon mesh to yield a coloring agent dispersion liquid having a volume average particle size of 200 nm and a solids content of 40.0% by mass.

Preparation of Wax Dispersion Liquid

Dipentaerythritol palmitic acid ester wax: 16.0 parts;
Wax dispersant: 8.0 parts
(copolymer having a peak molecular weight of 8,500 produced by graft copolymerization of 50.0 parts of styrene, 25.0 parts of n-butyl acrylate, 10.0 parts of acrylonitrile in the presence of 15.0 parts of polyethylene); and
Acetone: 76.0 parts.

The above ingredients were introduced into a glass beaker (Iwaki glass, manufactured by AGC Techno Glass) equipped with a stirring blade and warmed to 50° C. so that the wax was dissolved in the acetone.

Subsequently, the contents of the beaker were gradually cooled to 25° C. with stirring at 50 rpm over a period of 3 hours to yield a milky white liquid.

This liquid was added into a heat-resistant vessel with 20 parts of 1 mm-glass beads and was dispersed for 3 hours in a paint shaker. The glass beads were removed with a nylon mesh to yield a wax dispersion liquid having a volume average particle size of 270 nm and a solids content of 24% by mass.

Example 1

Production of Toner Particles 1

The following ingredients were added into a beaker:
Resin A solution 1: 200.0 parts;
Resin fine particle dispersion liquid 1: 42.0 parts;
Wax dispersion liquid: 20.0 parts; and
Coloring agent dispersion liquid: 12.0 parts.

After being adjusted to a temperature of 30.0° C., the contents of the beaker were stirred at 3000 rpm for 1 minute with DISPER (manufactured by Primix) to yield resin composition 1.

In the system shown in the FIGURE, resin composition 1 was introduced into the granulation tank t1 whose inner temperature had been adjusted to 30.0° C., and was adjusted to a temperature of 30.0° C. while being stirred at 300 rpm with valves V1 and V2 and the pressure regulating valve V3 closed. Carbon dioxide (purity: 99.99%) was introduced into the granulation tank t1 from the cylinder B1 with the valve V1 open. When the inner pressure reached 2.0 MPa, the valve V1 was closed.

The mass of the introduced carbon dioxide was 250.0 parts, which was measured with a mass flow meter.

After ensuring that the temperature in the granulation tank t1 was 30.0° C., the contents of the tank were stirred at 1000 rpm for 10 minutes to form droplets of the resin solution.

Then, after being charged with 4.0 parts of resin C solution 1, the resin solution tank t2 was adjusted to an inner temperature of 30° C. Carbon dioxide was introduced to the tank t2 from the cylinder B1 with the valve V4 open. When the inner pressure reached 2.5 MPa, the valve V4 was closed. The valve V2 was opened, and resin C solution 1 was introduced to the granulation tank t1 from the resin solution tank t2 with the pump P2 while the contents of the granulation tank t1 were stirred at 1000 rpm. On completing the introduction of resin C solution 1, the valve V2 was closed. The inner pressure of the granulation tank t1 was 2.2 MPa after the introduction. The total mass of the introduced carbon dioxide was 285.0 parts, which was measured with a mass flow meter.

The rotational speed was reduced to 300 rpm, and carbon dioxide was introduced to the granulation tank t1 from the cylinder B1 with the valve V1 open. When the inner pressure of the granulation tank t1 reached 5.0 MPa, the valve V1 was closed. Since the inner pressure exceeded the precipitation pressure of resin C1, resin C1 was precipitated at the surfaces of the droplets of the resin solution. After 5 minutes, carbon dioxide was introduced to the granulation tank t1 from the cylinder B1 with the pump P1 with the valve V1 open. At this time, carbon dioxide was further introduced (passed) while the inner pressure of the granulation tank t1 was kept at 8.0 MPa with the pressure regulating valve V3 set to 8.0 MPa. Thus, carbon dioxide containing the organic solvent (mainly acetone) extracted from the droplets was discharged to the solvent collection tank t3, and the organic solvent and carbon dioxide were separated.

After 1 hour, the pump P1 was stopped, and the inner pressure of the granulation tank t1 was reduced to the atmospheric pressure by gradually opening the pressure regulating valve V3 with the valve V1 closed, and toner particles 1 thus caught by a filter were collected.

EXAMPLES 2 to 8 and 10 to 34 and COMPARATIVE EXAMPLES 1 to 7

Toner particles 2 to 8 and 10 to 34 and comparative toner particles 1 to 7 were produced in the same manner as in Example 1, except that the ingredients and the amount thereof were changed as shown in Table 6.

TABLE 6

| | Particle | Resin A solution 1 Proportion (Parts by mass) | Dispersion liquid of resin fine particles Type | Proportion (Parts by mass) | Resin C solution Type | Proportion (Parts by mass) | Wax dispersion liquid Proportion (Parts by mass) | Coloring agent dispersion liquid Proportion (Parts by mass) |
|---|---|---|---|---|---|---|---|---|
| Example 1 | Toner particle 1 | 200.0 | Dispersion liquid 1 | 42.0 | Resin C solution 1 | 4.0 | 20.0 | 12.0 |
| Example 2 | Toner particle 2 | 200.0 | Dispersion liquid 1 | 42.0 | Resin C solution 2 | 4.0 | 20.0 | 12.0 |
| Example 3 | Toner particle 3 | 200.0 | Dispersion liquid 1 | 42.0 | Resin C solution 3 | 4.0 | 20.0 | 12.0 |
| Example 4 | Toner particle 4 | 200.0 | Dispersion liquid 1 | 42.0 | Resin C solution 4 | 4.0 | 20.0 | 12.0 |
| Example 5 | Toner particle 5 | 200.0 | Dispersion liquid 1 | 42.0 | Resin C solution 5 | 4.0 | 20.0 | 12.0 |
| Example 6 | Toner particle 6 | 200.0 | Dispersion liquid 1 | 42.0 | Resin C solution 6 | 4.0 | 20.0 | 12.0 |
| Example 7 | Toner particle 7 | 200.0 | Dispersion liquid 1 | 97.0 | Resin C solution 1 | 2.2 | 20.0 | 12.0 |
| Example 8 | Toner particle 8 | 200.0 | Dispersion liquid 1 | 42.8 | Resin C solution 1 | 7.0 | 20.0 | 12.0 |
| Example 9 | Toner particle 9 | 200.0 | Dispersion liquid 1 | 42.0 | Resin C solution 1 | 4.0 | 20.0 | 12.0 |
| Example 10 | Toner particle 10 | 200.0 | Dispersion liquid 1 | 100.0 | Resin C solution 1 | 9.6 | 20.0 | 12.0 |
| Example 11 | Toner particle 11 | 200.0 | Dispersion liquid 1 | 100.0 | Resin C solution 1 | 10.4 | 20.0 | 12.0 |
| Example 12 | Toner particle 12 | 200.0 | Dispersion liquid 1 | 42.0 | Resin C solution 1 | 1.6 | 20.0 | 12.0 |
| Example 13 | Toner particle 13 | 200.0 | Dispersion liquid 1 | 42.0 | Resin C solution 7 | 4.0 | 20.0 | 12.0 |
| Example 14 | Toner particle 14 | 200.0 | Dispersion liquid 1 | 42.0 | Resin C solution 8 | 4.0 | 20.0 | 12.0 |
| Example 15 | Toner particle 15 | 200.0 | Dispersion liquid 1 | 42.0 | Resin C solution 9 | 4.0 | 20.0 | 12.0 |
| Example 16 | Toner particle 16 | 200.0 | Dispersion liquid 1 | 42.0 | Resin C solution 10 | 4.0 | 20.0 | 12.0 |
| Example 17 | Toner particle 17 | 200.0 | Dispersion liquid 1 | 42.0 | Resin C solution 11 | 4.0 | 20.0 | 12.0 |
| Example 18 | Toner particle 18 | 200.0 | Dispersion liquid 1 | 42.0 | Resin C solution 12 | 4.0 | 20.0 | 12.0 |
| Example 19 | Toner particle 19 | 200.0 | Dispersion liquid 1 | 42.0 | Resin C solution 13 | 4.0 | 20.0 | 12.0 |
| Example 20 | Toner particle 20 | 200.0 | Dispersion liquid 1 | 42.0 | Resin C solution 14 | 4.0 | 20.0 | 12.0 |
| Example 21 | Toner particle 21 | 200.0 | Dispersion liquid 1 | 42.0 | Resin C solution 15 | 4.0 | 20.0 | 12.0 |

TABLE 6-continued

|  | Particle | Resin A solution 1 Proportion (Parts by mass) | Dispersion liquid of resin fine particles Type | Proportion (Parts by mass) | Resin C solution Type | Proportion (Parts by mass) | Wax dispersion liquid Proportion (Parts by mass) | Coloring agent dispersion liquid Proportion (Parts by mass) |
|---|---|---|---|---|---|---|---|---|
| Example 22 | Toner particle 22 | 200.0 | Dispersion liquid 1 | 42.0 | Resin C solution 16 | 4.0 | 20.0 | 12.0 |
| Example 23 | Toner particle 23 | 200.0 | Dispersion liquid 1 | 42.0 | Resin C solution 17 | 4.0 | 20.0 | 12.0 |
| Example 24 | Toner particle 24 | 200.0 | Dispersion liquid 1 | 42.0 | Resin C solution 18 | 4.0 | 20.0 | 12.0 |
| Example 25 | Toner particle 25 | 200.0 | Dispersion liquid 1 | 42.0 | Resin C solution 19 | 4.0 | 20.0 | 12.0 |
| Example 26 | Toner particle 26 | 200.0 | Dispersion liquid 2 | 42.0 | Resin C solution 1 | 4.0 | 20.0 | 12.0 |
| Example 27 | Toner particle 27 | 200.0 | Dispersion liquid 3 | 42.0 | Resin C solution 1 | 4.0 | 20.0 | 12.0 |
| Example 28 | Toner particle 28 | 200.0 | Dispersion liquid 4 | 42.0 | Resin C solution 1 | 4.0 | 20.0 | 12.0 |
| Example 29 | Toner particle 29 | 200.0 | Dispersion liquid 5 | 42.0 | Resin C solution 1 | 4.0 | 20.0 | 12.0 |
| Example 30 | Toner particle 30 | 200.0 | Dispersion liquid 6 | 42.0 | Resin C solution 1 | 4.0 | 20.0 | 12.0 |
| Example 31 | Toner particle 31 | 200.0 | Dispersion liquid 7 | 42.0 | Resin C solution 1 | 4.0 | 20.0 | 12.0 |
| Example 32 | Toner particle 32 | 200.0 | Dispersion liquid 8 | 42.0 | Resin C solution 1 | 4.0 | 20.0 | 12.0 |
| Example 33 | Toner particle 33 | 200.0 | Dispersion liquid 9 | 42.0 | Resin C solution 1 | 4.0 | 20.0 | 12.0 |
| Example 34 | Toner particle 34 | 219.0 | Dispersion liquid 10 | 42.0 | Resin C solution 1 | 4.0 | 20.0 | 12.0 |
| Example 35 | Resin particle 1 | 200.0 | Dispersion liquid 1 | 42.0 | Resin C solution 1 | 4.0 | — | — |
| Comparative Example 1 | Comparative toner particle 1 | 200.0 | Dispersion liquid 1 | 42.0 | Resin C solution 20 | 4.0 | 20.0 | 12.0 |
| Comparative Example 2 | Comparative toner particle 2 | 200.0 | Dispersion liquid 1 | 42.0 | Resin C solution 21 | 4.0 | 20.0 | 12.0 |
| Comparative Example 3 | Comparative toner particle 3 | 200.0 | Dispersion liquid 1 | 42.0 | Resin C solution 22 | 4.0 | 20.0 | 12.0 |
| Comparative Example 4 | Comparative toner particle 4 | 200.0 | Dispersion liquid 1 | 43.5 | Resin C solution 1 | 11.0 | 20.0 | 12.0 |
| Comparative Example 5 | Comparative toner particle 5 | 200.0 | Dispersion liquid 1 | 42.0 | Comparative resin C solution 1 | 4.0 | 20.0 | 12.0 |
| Comparative Example 6 | Comparative toner particle 6 | 200.0 | Dispersion liquid 1 | 42.0 | Comparative resin C solution 2 | 4.0 | 20.0 | 12.0 |
| Comparative Example 7 | Comparative toner particle 7 | 200.0 | Dispersion liquid 1 | 42.0 | Amino-modified silicone | 2.0 | 20.0 | 12.0 |

Example 9

Production of Toner Particles 9

The following ingredients were added into a beaker:
Resin A solution 1: 200.0 parts;
Resin C solution 1: 4.0 parts;
Resin particle dispersion liquid 1: 42.0 parts;
Wax dispersion liquid: 20.0 parts; and
Coloring agent dispersion Liquid: 12.0 parts.

After being adjusted to a temperature of 30.0° C., the contents of the beaker were stirred at 3000 rpm for 1 minute with DISPER to yield resin composition 9.

In the system shown in the FIGURE, resin composition 9 was introduced into the granulation tank t1 whose inner temperature had been adjusted to 30.0° C., and was adjusted to a temperature of 30.0° C. while being stirred at 300 rpm with the valves V1 and V2 and the pressure regulating valve V3 closed. Carbon dioxide (purity: 99.99%) was introduced into the granulation tank t1 from the cylinder B1 with the valve V1 open. When the inner pressure reached 2.0 MPa, the valve V1 was closed.

The mass of the introduced carbon dioxide was 250.0 parts, which was measured with a mass flow meter.

After ensuring that the temperature in the granulation tank t1 was 30.0° C., the contents of the tank were stirred at 1000 rpm for 10 minutes to form droplets of the resin solution.

The rotational speed was reduced to 300 rpm, and carbon dioxide was introduced to the granulation tank t1 from the cylinder B1 with the valve V1 open. When the inner pressure of the granulation tank t1 reached 5.0 MPa, the valve V1 was closed. Since the inner pressure exceeded the precipitation pressure of resin C1, resin C1 was precipitated at the surfaces of the droplets of the resin solution. After 5 minutes, carbon dioxide was introduced to the granulation tank t1 from the cylinder B1 with the pump P1 with the valve V1 open. At this time, carbon dioxide was further introduced (passed) while the inner pressure of the granulation tank t1 was kept at 8.0 MPa with the pressure regulating valve V3 set to 8.0 MPa. Thus, carbon dioxide containing the organic solvent (mainly acetone) extracted from the droplets was discharged to the solvent collection tank t3, and the organic solvent and carbon dioxide were separated.

After 1 hour, the pump P1 was stopped, and the inner pressure of the granulation tank t1 was reduced to the atmospheric pressure by gradually opening the pressure regulating valve V3 with the valve V1 closed, and toner particles 9 thus caught by a filter were collected.

Comparative Example 7

Comparative toner particles 7 were produced in the same manner as in Example 1, except that resin C solution 1 was replaced with 2.0 parts of an amino-modified silicone.

The amino-modified silicone used in Comparative Example 7, which has the structure represented by the following formula (v), was not precipitated even at 8.0 MPa.

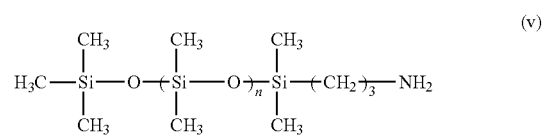
(v)

In formula (v), n (degree of polymerization) is 27.

Example 35

Resin particles 1 were produced in the same manner as in Example 1, except that the wax dispersion liquid and the coloring agent dispersion liquid were not added.

The ingredients, the charges (proportions) thereof, and conditions for producing the above-described toner particles and resin particles are shown in Table 7.

TABLE 7

| | Particle | Resin C to fine particulate resin (mass %) | Resin C to resin A (mass %) | Resin B to toner particles (mass %) | Resin C addition timing |
|---|---|---|---|---|---|
| Example 1 | Toner particle 1 | 23.8 | 2.0 | 7.0 | After droplet formation |
| Example 2 | Toner particle 2 | 23.8 | 2.0 | 7.0 | After droplet formation |
| Example 3 | Toner particle 3 | 23.8 | 2.0 | 7.0 | After droplet formation |
| Example 4 | Toner particle 4 | 23.8 | 2.0 | 7.0 | After droplet formation |
| Example 5 | Toner particle 5 | 23.8 | 2.0 | 7.0 | After droplet formation |
| Example 6 | Toner particle 6 | 23.8 | 2.0 | 7.0 | After droplet formation |
| Example 7 | Toner particle 7 | 5.7 | 1.1 | 14.9 | After droplet formation |
| Example 8 | Toner particle 8 | 40.9 | 3.5 | 7.0 | After droplet formation |
| Example 9 | Toner particle 9 | 23.8 | 2.0 | 7.0 | Before droplet formation |
| Example 10 | Toner particle 10 | 24.0 | 4.8 | 14.9 | After droplet formation |
| Example 11 | Toner particle 11 | 26.0 | 5.2 | 14.9 | After droplet formation |
| Example 12 | Toner particle 12 | 9.5 | 0.8 | 7.0 | After droplet formation |
| Example 13 | Toner particle 13 | 23.8 | 2.0 | 7.0 | After droplet formation |
| Example 14 | Toner particle 14 | 23.8 | 2.0 | 7.0 | After droplet formation |
| Example 15 | Toner particle 15 | 23.8 | 2.0 | 7.0 | After droplet formation |
| Example 16 | Toner particle 16 | 23.8 | 2.0 | 7.0 | After droplet formation |
| Example 17 | Toner particle 17 | 23.8 | 2.0 | 7.0 | After droplet formation |
| Example 18 | Toner particle 18 | 23.8 | 2.0 | 7.0 | After droplet formation |
| Example 19 | Toner particle 19 | 23.8 | 2.0 | 7.0 | After droplet formation |
| Example 20 | Toner particle 20 | 23.8 | 2.0 | 7.0 | After droplet formation |
| Example 21 | Toner particle 21 | 23.8 | 2.0 | 7.0 | After droplet formation |
| Example 22 | Toner particle 22 | 23.8 | 2.0 | 7.0 | After droplet formation |
| Example 23 | Toner particle 23 | 23.8 | 2.0 | 7.0 | After droplet formation |
| Example 24 | Toner particle 24 | 23.8 | 2.0 | 7.0 | After droplet formation |
| Example 25 | Toner particle 25 | 23.8 | 2.0 | 7.0 | After droplet formation |
| Example 26 | Toner particle 26 | 23.8 | 2.0 | 7.0 | After droplet formation |
| Example 27 | Toner particle 27 | 23.8 | 2.0 | 7.0 | After droplet formation |
| Example 28 | Toner particle 28 | 23.8 | 2.0 | 7.0 | After droplet formation |
| Example 29 | Toner particle 29 | 23.8 | 2.0 | 7.0 | After droplet formation |
| Example 30 | Toner particle 30 | 23.8 | 2.0 | 7.0 | After droplet formation |
| Example 31 | Toner particle 31 | 23.8 | 2.0 | 7.0 | After droplet formation |
| Example 32 | Toner particle 32 | 23.8 | 2.0 | 7.0 | After droplet formation |
| Example 33 | Toner particle 33 | 23.8 | 2.0 | 7.0 | After droplet formation |
| Example 34 | Toner particle 34 | 23.8 | 2.0 | 7.0 | After droplet formation |
| Example 35 | Resin particle 1 | 23.8 | 2.0 | 7.0 | After droplet formation |
| Comparative Example 1 | Comparative toner particle 1 | 23.8 | 2.0 | 7.0 | After droplet formation |
| Comparative Example 2 | Comparative toner particle 2 | 23.8 | 2.0 | 7.0 | After droplet formation |
| Comparative Example 3 | Comparative toner particle 3 | 23.8 | 2.0 | 7.0 | After droplet formation |
| Comparative Example 4 | Comparative toner particle 4 | 63.2 | 5.5 | 7.0 | After droplet formation |
| Comparative Example 5 | Comparative toner particle 5 | 23.8 | 2.0 | 7.0 | After droplet formation |
| Comparative Example 6 | Comparative toner particle 6 | 23.8 | 2.0 | 7.0 | After droplet formation |
| Comparative Example 7 | Comparative toner particle 7 | 23.8 | 2.0 | 7.0 | After droplet formation |

| | $SP_A$ | $SP_X$ | $SP_Y$ | $P_Y$ | $P_Z$ | $SP_Y - SP_X$ | $(SP_X + SP_Y)/2$ | $P_Z - P_Y$ |
|---|---|---|---|---|---|---|---|---|
| Example 1 | 18.5 | 13.5 | 18.1 | 3.6 | 5.3 | 4.6 | 15.8 | 1.7 |
| Example 2 | 18.5 | 13.5 | 18.1 | 3.6 | 5.3 | 4.6 | 15.8 | 1.7 |
| Example 3 | 18.5 | 13.5 | 18.1 | 3.6 | 5.3 | 4.6 | 15.8 | 1.7 |
| Example 4 | 18.5 | 13.5 | 18.1 | 3.6 | 5.3 | 4.6 | 15.8 | 1.7 |
| Example 5 | 18.5 | 13.5 | 18.1 | 3.6 | 5.3 | 4.6 | 15.8 | 1.7 |
| Example 6 | 18.5 | 13.5 | 18.1 | 3.6 | 5.3 | 4.6 | 15.8 | 1.7 |
| Example 7 | 18.5 | 13.5 | 18.1 | 3.6 | 5.3 | 4.6 | 15.8 | 1.7 |
| Example 8 | 18.5 | 13.5 | 18.1 | 3.6 | 5.3 | 4.6 | 15.8 | 1.7 |
| Example 9 | 18.5 | 13.5 | 18.1 | 3.6 | 5.3 | 4.6 | 15.8 | 1.7 |
| Example 10 | 18.5 | 13.5 | 18.1 | 3.6 | 5.3 | 4.6 | 15.8 | 1.7 |

TABLE 7-continued

| | | | | | | | | |
|---|---|---|---|---|---|---|---|---|
| Example 11 | 18.5 | 13.5 | 18.1 | 3.6 | 5.3 | 4.6 | 15.8 | 1.7 |
| Example 12 | 18.5 | 13.5 | 18.1 | 3.6 | 5.3 | 4.6 | 15.8 | 1.7 |
| Example 13 | 18.5 | 13.5 | 18.1 | 3.6 | 5.3 | 4.6 | 15.8 | 1.7 |
| Example 14 | 18.5 | 13.5 | 18.1 | 3.6 | 5.3 | 4.6 | 15.8 | 1.7 |
| Example 15 | 18.5 | 13.5 | 18.1 | 3.6 | 5.3 | 4.6 | 15.8 | 1.7 |
| Example 16 | 18.5 | 13.5 | 18.1 | 3.6 | 5.3 | 4.6 | 15.8 | 1.7 |
| Example 17 | 18.5 | 13.5 | 18.1 | 3.6 | 5.3 | 4.6 | 15.8 | 1.7 |
| Example 18 | 18.5 | 13.5 | 18.1 | 3.6 | 5.3 | 4.6 | 15.8 | 1.7 |
| Example 19 | 18.5 | 13.5 | 18.1 | 3.6 | 5.3 | 4.6 | 15.8 | 1.7 |
| Example 20 | 18.5 | 13.5 | 18.1 | 3.6 | 5.3 | 4.6 | 15.8 | 1.7 |
| Example 21 | 18.5 | 13.5 | 18.1 | 3.6 | 5.3 | 4.6 | 15.8 | 1.7 |
| Example 22 | 18.5 | 13.5 | 18.1 | 3.6 | 5.3 | 4.6 | 15.8 | 1.7 |
| Example 23 | 18.5 | 13.5 | 18.1 | 3.6 | 5.3 | 4.6 | 15.8 | 1.7 |
| Example 24 | 18.5 | 13.5 | 18.1 | 3.6 | 5.3 | 4.6 | 15.8 | 1.7 |
| Example 25 | 18.5 | 13.5 | 18.1 | 3.6 | 5.3 | 4.6 | 15.8 | 1.7 |
| Example 26 | 18.5 | 13.5 | 18.1 | 3.6 | 4.7 | 4.6 | 15.8 | 1.1 |
| Example 27 | 18.5 | 13.5 | 18.1 | 3.6 | 6.1 | 4.6 | 15.8 | 2.5 |
| Example 28 | 18.5 | 13.5 | 18.1 | 3.6 | 10.2 | 4.6 | 15.8 | 6.6 |
| Example 29 | 18.5 | 13.5 | 18.1 | 3.6 | 3.9 | 4.6 | 15.8 | 0.3 |
| Example 30 | 18.5 | 13.5 | 18.1 | 3.6 | 2.8 | 4.6 | 15.8 | −0.8 |
| Example 31 | 18.5 | 13.5 | 18.1 | 3.6 | 5.3 | 4.6 | 15.8 | 1.7 |
| Example 32 | 18.5 | 13.5 | 18.1 | 3.6 | 5.3 | 4.6 | 15.8 | 1.7 |
| Example 33 | 18.5 | 13.5 | 18.1 | 3.6 | 5.3 | 4.6 | 15.8 | 1.7 |
| Example 34 | 18.5 | 13.5 | 18.1 | 3.6 | 5.3 | 4.6 | 15.8 | 1.7 |
| Example 35 | 18.5 | 13.5 | 18.1 | 3.6 | 5.3 | 4.6 | 15.8 | 1.7 |
| Comparative Example 1 | 18.5 | 13.5 | 18.1 | 3.6 | 5.3 | 4.6 | 15.8 | 1.7 |
| Comparative Example 2 | 18.5 | 13.5 | 18.1 | 3.6 | 5.3 | 4.6 | 15.8 | 1.7 |
| Comparative Example 3 | 18.5 | 13.5 | 18.1 | 3.6 | 5.3 | 4.6 | 15.8 | 1.7 |
| Comparative Example 4 | 18.5 | 13.5 | 18.1 | 3.6 | 5.3 | 4.6 | 15.8 | 1.7 |
| Comparative Example 5 | 18.5 | 13.5 | 18.1 | 3.6 | 5.3 | 4.6 | 15.8 | 1.7 |
| Comparative Example 6 | 18.5 | 13.5 | 18.1 | 3.6 | 5.3 | 4.6 | 15.8 | 1.7 |
| Comparative Example 7 | 18.5 | 13.5 | 18.1 | 3.6 | 5.3 | 4.6 | 15.8 | 1.7 |

Evaluation

The particle size distribution and the aspect ratio of each sample of the toner particles and the resin particles were measured. The results are shown in Table 8. The rating criteria are as follows.

(1) Particle Size Distribution
  A: D4/D1 was less than 1.10.
  B: D4/D1 was at least 1.10 and less than 1.20.
  C: D4/D1 was at least 1.20 and less than 1.30.
  D: D4/D1 was at least 1.30.

(2) Aspect Ratio
  A: Aspect ratio was less than 1.100.
  B: Aspect ratio was at least 1.100 and less than 1.150.
  C: Aspect ratio was at least 1.150 and less than 1.200.
  D: Aspect ratio was at least 1.200.

TABLE 8

| | Particle size distribution | | | | Aggregate Aspect ratio | Rating |
|---|---|---|---|---|---|---|
| | D4 | D1 | D4/D1 | Rating | | |
| Example 1 | 5.4 | 5.0 | 1.08 | A | 1.057 | A |
| Example 2 | 6.3 | 5.5 | 1.15 | B | 1.195 | C |
| Example 3 | 7.4 | 5.8 | 1.28 | C | 1.082 | A |
| Example 4 | 5.6 | 5.2 | 1.08 | A | 1.148 | B |
| Example 5 | 6.0 | 5.2 | 1.15 | B | 1.075 | A |
| Example 6 | 6.7 | 5.2 | 1.29 | C | 1.063 | A |
| Example 7 | 5.2 | 4.4 | 1.18 | B | 1.188 | C |
| Example 8 | 6.6 | 5.2 | 1.27 | C | 1.089 | A |
| Example 9 | 6.5 | 5.3 | 1.23 | C | 1.189 | C |
| Example 10 | 5.3 | 4.3 | 1.23 | C | 1.109 | B |
| Example 11 | 5.4 | 4.2 | 1.29 | C | 1.128 | B |
| Example 12 | 6.4 | 5.2 | 1.23 | C | 1.198 | C |
| Example 13 | 5.6 | 5.2 | 1.08 | A | 1.148 | B |
| Example 14 | 5.9 | 5.2 | 1.13 | B | 1.152 | C |
| Example 15 | 5.7 | 5.3 | 1.08 | A | 1.146 | B |
| Example 16 | 6.0 | 5.3 | 1.13 | B | 1.155 | C |
| Example 17 | 5.5 | 5.1 | 1.08 | A | 1.143 | B |
| Example 18 | 5.8 | 5.1 | 1.14 | B | 1.153 | C |
| Example 19 | 5.5 | 5.1 | 1.08 | A | 1.148 | B |
| Example 20 | 5.8 | 5.1 | 1.14 | B | 1.156 | C |
| Example 21 | 5.4 | 5.0 | 1.08 | A | 1.146 | B |
| Example 22 | 5.8 | 5.1 | 1.14 | B | 1.192 | C |
| Example 23 | 6.0 | 5.3 | 1.13 | B | 1.190 | C |
| Example 24 | 5.4 | 5.0 | 1.08 | A | 1.146 | B |
| Example 25 | 5.7 | 5.0 | 1.14 | B | 1.153 | C |
| Example 26 | 6.9 | 5.7 | 1.21 | C | 1.128 | B |
| Example 27 | 5.6 | 5.2 | 1.08 | A | 1.124 | B |
| Example 28 | 5.8 | 5.3 | 1.09 | A | 1.148 | B |
| Example 29 | 7.5 | 6.0 | 1.25 | C | 1.182 | C |
| Example 30 | 8.2 | 6.4 | 1.28 | C | 1.173 | C |
| Example 31 | 5.8 | 5.3 | 1.09 | A | 1.104 | B |
| Example 32 | 6.4 | 5.4 | 1.19 | B | 1.188 | C |
| Example 33 | 6.5 | 5.8 | 1.12 | B | 1.148 | B |
| Example 34 | 7.4 | 6.2 | 1.19 | B | 1.180 | C |
| Example 35 | 5.4 | 5.0 | 1.08 | A | 1.057 | A |
| Comparative Example 1 | 6.6 | 5.4 | 1.22 | C | 1.232 | D |
| Comparative Example 2 | 8.8 | 6.4 | 1.38 | D | 1.109 | B |
| Comparative Example 3 | 7.0 | 5.3 | 1.32 | D | 1.113 | B |
| Comparative Example 4 | 7.2 | 5.3 | 1.36 | D | 1.107 | B |

TABLE 8-continued

| | Particle size distribution | | | Aggregate | |
| | | | | Aspect | |
| | D4 | D1 | D4/D1 | Rating | ratio | Rating |
|---|---|---|---|---|---|---|
| Comparative Example 5 | 6.3 | 5.2 | 1.21 | C | 1.238 | D |
| Comparative Example 6 | 6.6 | 5.4 | 1.22 | C | 1.225 | D |
| Comparative Example 7 | 6.2 | 5.1 | 1.22 | C | 1.210 | D |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-120400 filed Jun. 17, 2016, which is hereby incorporated by reference herein in its entirety.

What is claimed is:

1. A method for producing a toner particle, the method comprising the steps of:
  (a) mixing a binder resin A, resin fine particles containing a resin B, a resin C, an organic solvent, and carbon dioxide, thereby forming a droplet of a resin solution containing the binder resin A, the droplet being covered with the resin fine particles;
  (b) applying a pressure by introducing carbon dioxide, thereby precipitating the resin C at the surface of the droplet; and
  (c) passing carbon dioxide so as to remove the organic solvent from the droplet with the carbon dioxide,
  wherein the resin C has an organic polysiloxane structure represented by the following formula (i) and a weight average molecular weight Mw of at least 50,000 and not more than 500,000, and the ratio Mw/Mn of the weight average molecular weight Mw to the number average molecular weight Mn of the resin C is not more than 5.0, and
  the proportion of the mass of the resin C to the mass of the resin fine particles is at least 5.0% by mass and not more than 50.0% by mass:

(i)

wherein $R^1$ represents an alkyl group having a carbon number of 1 to 3, and n represents the degree of polymerization.

2. The method according to claim 1, wherein the resin C is soluble in the organic solvent.

3. The method according to claim 1, wherein the step (a) includes:
  (a1) mixing a resin solution of the binder resin A in the organic solvent, the resin fine particles, and carbon dioxide, thereby forming the droplet of the resin solution, the droplet being covered with the resin fine particles; and
  (a2) adding the resin C, thereby forming a suspension droplet including the droplet of the resin solution and the resin C at the surface of the droplet.

4. The method according to claim 1, wherein the toner particle contains the resin C with a proportion of at least 1.0% by mass and not more than 5.0% by mass relative to the binder resin A.

5. The method according to claim 1, wherein the resin C has a crystalline segment.

6. The method according to claim 5, wherein the crystalline segment is a crystalline polyester structure.

7. The method according to claim 6, wherein the resin C is a polymer obtained by polymerizing a monomer composition containing a monomer S having the organic polysiloxane structure represented by the formula (i) and a monomer T having the crystalline polyester structure.

8. The method according to claim 7, wherein the monomer composition contains the monomer S with a content of at least 20.0% by mass and not more than 50.0% by mass relative to the mass of the monomer composition.

9. The method according to claim 7, wherein the monomer composition contains the monomer T with a content of at least 20.0% by mass and not more than 60.0% by mass relative to the mass of the monomer composition.

10. The method according to claim 7, wherein the monomer S has a number average molecular weight of at least 3,000 and not more than 30,000.

11. The method according to claim 7, wherein the monomer T has a number average molecular weight of at least 2,000 and not more than 15,000.

12. The method according to claim 1, wherein the resin B is a polymer obtained by polymerizing a monomer composition containing:
  a monomer X having an organic polysiloxane structure represented by the formula (i) and a polymerizable unsaturated group at one end thereof,
  a monomer Y having a polymerizable unsaturated group at one end thereof, and
  a monomer Z having at least two polymerizable unsaturated groups in the molecule thereof,
  wherein the monomers X, Y, and Z and the binder resin A satisfy the following relationships (1) to (3):

$$SP_Y - SP_X \geq 2.0 \quad (1);$$

$$(SP_X + SP_Y)/2 < SP_A \quad (2); \text{ and}$$

$$P_Z - P_Y \geq 1.0 \quad (3)$$

wherein in formulas (1) to (3), $SP_X$ represents a solubility parameter of the monomer X, $SP_Y$ represents a solubility parameter of the monomer Y, $P_Y$ represents a polarity parameter of the solubility parameter of the monomer Y, $P_Z$ represents a polarity parameter of the solubility parameter of the monomer Z, and $SP_A$ represents a solubility parameter of the binder resin A.

13. The method according to claim 12, wherein the monomer composition contains the monomer Z with a proportion of at least 1.0% by mass and not more than 10.0% by mass relative to the mass of the monomer composition.

14. The method according to claim 12, wherein the monomer Z has a number average molecular weight of at least 200 and not more than 2,000.

15. The method according to claim 1, wherein the toner particle contains the resin B with a content of at least 3.0% by mass and not more than 15.0% by mass relative to the mass of the toner particle.

16. The method according to claim 1, wherein n is at least 2.

17. A method for producing a resin particle, the method comprising the steps of:
  (a) mixing a binder resin A, resin fine particles containing a resin B, a resin C, an organic solvent, and carbon dioxide, thereby forming a droplet of a resin solution containing the binder resin A, the droplet being covered with the resin fine particles;
  (b) applying a pressure by introducing carbon dioxide, thereby precipitating the resin C at the surface of the droplet; and
  (c) passing carbon dioxide so as to remove the organic solvent from the droplet with the carbon dioxide,
  wherein the resin C has an organic polysiloxane structure represented by the following formula (i) and a weight average molecular weight Mw of at least 50,000 and not more than 500,000, and the ratio Mw/Mn of the weight average molecular weight Mw to the number average molecular weight Mn of the resin C is not more than 5.0, and the proportion of the mass of the resin C to the mass of the resin fine particles is at least 5.0% by mass and not more than 50.0% by mass:

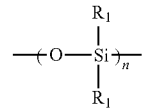

wherein $R^1$ represents an alkyl group having a carbon number of 1 to 3, and n represents the degree of polymerization.

18. The method according to claim 17, wherein n is at least 2.

* * * * *